US008860261B2

(12) United States Patent
Makino et al.

(10) Patent No.: US 8,860,261 B2
(45) Date of Patent: Oct. 14, 2014

(54) ACTUATOR

(75) Inventors: Shogo Makino, Fukuoka (JP); Toru Shikayama, Fukuoka (JP); Haruki Yahara, Fukuoka (JP)

(73) Assignee: Kabushiki Kaisha Yaskawa Denki, Kitakyushu-Shi (JP)

(*) Notice: Subject to any disclaimer, the term of this patent is extended or adjusted under 35 U.S.C. 154(b) by 526 days.

(21) Appl. No.: 13/174,672

(22) Filed: Jun. 30, 2011

(65) Prior Publication Data

US 2012/0001499 A1    Jan. 5, 2012

(30) Foreign Application Priority Data

Jul. 1, 2010    (JP) .................................. 2010-150839
Jul. 30, 2010   (JP) .................................. 2010-172480
Jul. 30, 2010   (JP) .................................. 2010-172481

(51) Int. Cl.
*H02K 41/02*    (2006.01)

(52) U.S. Cl.
USPC ...................................... 310/12.14; 310/68 B

(58) Field of Classification Search
USPC .......................... 310/12.14, 15, 30, 16, 68 B
See application file for complete search history.

(56) References Cited

U.S. PATENT DOCUMENTS

| 5,446,323 | A  | * | 8/1995 | Neff et al. ................... 310/12.27 |
| 6,081,051 | A  | * | 6/2000 | Kitazawa et al. ................ 310/20 |
| 6,376,940 | B1 | * | 4/2002 | Shibuya et al. ............. 310/12.14 |
| 7,336,007 | B2 | * | 2/2008 | Chitayat et al. ............ 310/12.07 |
| 7,482,717 | B2 | * | 1/2009 | Hochhalter et al. ....... 310/12.14 |
| 7,973,435 | B2 | * | 7/2011 | Finkbeiner et al. ........ 310/12.01 |
| 2011/0005328 | A1 | * | 1/2011 | Hayford et al. .................. 73/788 |
| 2011/0181129 | A1 |   | 7/2011 | Aso et al. |
| 2012/0017539 | A1 | * | 1/2012 | Neufeld et al. ................. 53/285 |

FOREIGN PATENT DOCUMENTS

| JP | 63-228941 | 9/1988 |
| JP | 08-009602 | 1/1996 |
| JP | 2000-014115 | 1/2000 |
| JP | 2001-128422 | 5/2001 |
| JP | 2001-258206 | 9/2001 |
| JP | 2003-117876 | 4/2003 |
| JP | 2004-045080 | 2/2004 |
| JP | 2006-132709 | 5/2006 |
| JP | 2006-311715 | 11/2006 |
| JP | 2007-057440 | 3/2007 |
| JP | 2007-142332 | 6/2007 |
| JP | 2007-143385 | 6/2007 |
| JP | 2007-209159 | 8/2007 |
| JP | 2008-236818 | 10/2008 |
| JP | 2008-300404 | 12/2008 |

OTHER PUBLICATIONS

Japanese Office Action for corresponding JP Application No. 2010-172480, Jun. 5, 2012.

(Continued)

*Primary Examiner* — Thanh Lam
(74) *Attorney, Agent, or Firm* — Mori & Ward, LLP

(57) ABSTRACT

An actuator according to an embodiment includes support mechanisms that are disposed in plural places of an output shaft in a longitudinal direction and support the output shaft in a linear direction and a rotation direction, a motor portion that is disposed in a longitudinal direction of the output shaft and drives the output shaft in the linear direction and the rotation direction, a first detecting portion that detects an angle of a rotation direction of the output shaft, and a second detecting portion that detects displacement of the direct direction of the output shaft.

15 Claims, 17 Drawing Sheets

(56) References Cited

OTHER PUBLICATIONS

Japanese Office Action for corresponding JP Application No. 2010-172481, Nov. 6, 2012.
Japanese Decision of a Patent Grant for corresponding JP Application No. 2010-172480, Feb. 5, 2013.
Japanese Office Action for corresponding JP Application No. 2010-150839, Jul. 24, 2012.
Japanese Office Action for corresponding JP Application No. 2010-172481, Jul. 24, 2012.
European Communication pursuant to Rule 114(2) EPC for corresponding EP Application No. 11171927.4-1804, Dec. 18, 2013.
Korean Office Action for corresponding KR Application No. 10-2011-0064643, Jul. 28, 2014.
Chinese Office Action for corresponding CN Application No. 201110185595.9, Aug. 4, 2014.

* cited by examiner

ACTUATOR

CROSS-REFERENCE TO RELATED APPLICATIONS

This application is based upon and claims the benefit of priority of the prior Japanese Patent Application No. 2010-150839, filed on Jul. 1, 2010; Japanese Patent Application No. 2010-172480, filed on Jul. 30, 2010; and Japanese Patent Application No. 2010-172481, filed on Jul. 30, 2010, the entire contents of all of which are incorporated herein by reference.

FIELD

The embodiments discussed herein are directed to an actuator.

BACKGROUND

In the related art, in order to realize a rotation operation and a linear operation, the applicants suggest an actuator having a configuration in which armature windings of a rotation motor and a linear motor overlap in a concentric shape, disposes a linear/rotation scale of one end of a mover and a linear/rotation detector of one end of a stator to face each other, and generates torque and thrust force directly in the mover, in Japanese Patent Application Laid-Open No. 2007-143385.

However, the applicants consider that it is preferable to realize high precision or a high output of an actuator according to needs of the market, while performing research and development.

SUMMARY

An actuator according to one aspect of an embodiment includes support mechanisms that are disposed in plural places of an output shaft in a longitudinal direction to form a concentric shape in a frame and support the output shaft in a linear direction and a rotation direction, motor portions that are disposed in a longitudinal direction of the output shaft and drive the output shaft in the linear direction and the rotation direction, and a detecting portion including a first detecting portion that detects an angle of the rotation direction of the output shaft and a second detecting portion that detects linear/rotation displacement of the output shaft.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS

Figure 1:
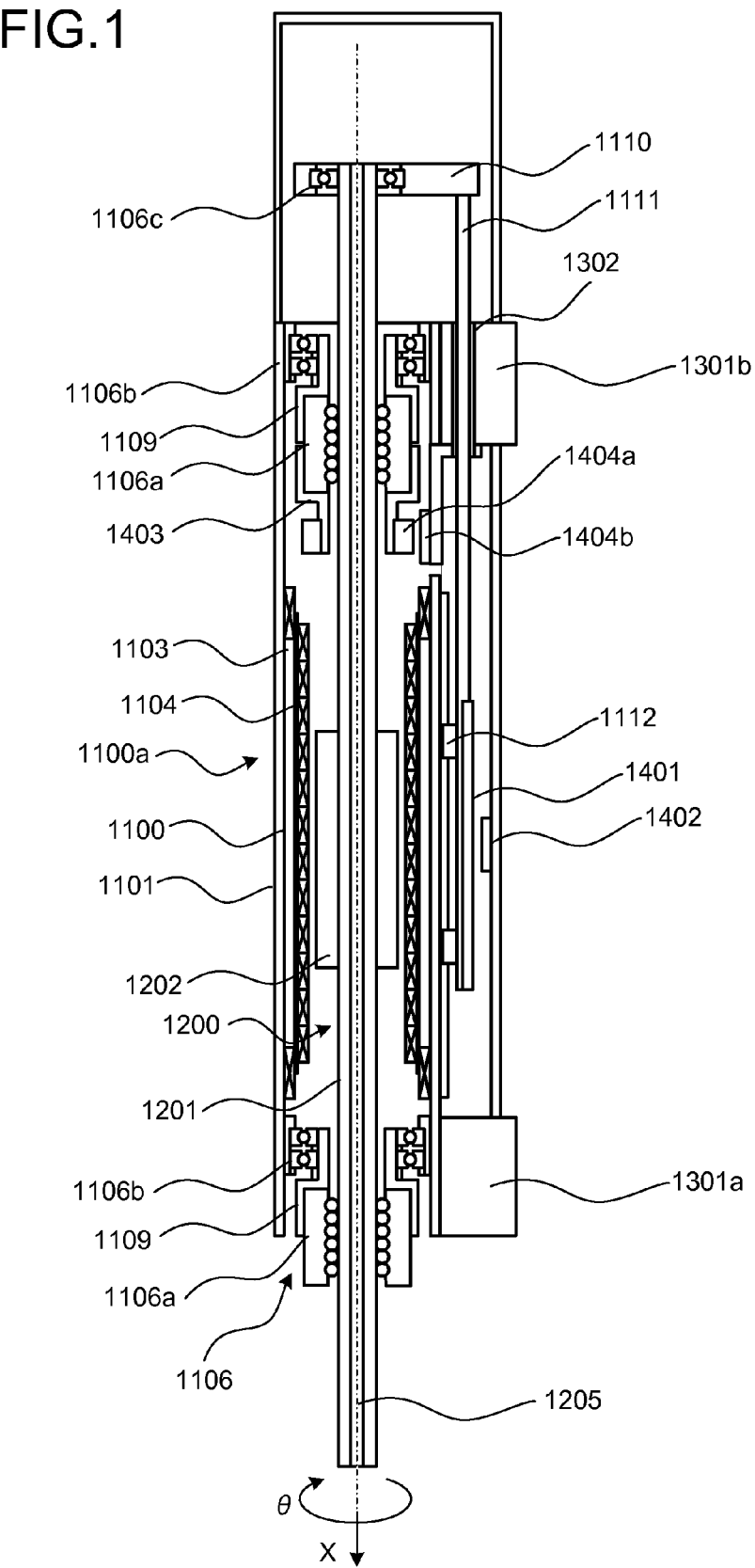
FIG. 1 is a lateral cross-sectional view of an actuator according to a first embodiment.

An actuator according to an embodiment includes support mechanisms that are disposed in plural places of an output shaft in a longitudinal direction to form a concentric shape in a frame and support the output shaft in a linear direction and a rotation direction, motor portions that are disposed in a longitudinal direction of the output shaft and drive the output shaft in the linear direction and the rotation direction, and a detecting portion including a first detecting portion that detects an angle of the rotation direction of the output shaft and a second detecting portion that detects linear/rotation displacement of the output shaft.

An actuator according to an embodiment includes support units that are disposed in plural places of an output shaft in a longitudinal direction and support the output shaft in a linear direction and a rotation direction, driving units that drive the output shaft in the linear direction and the rotation direction, and a detecting unit including a first detecting unit that detects an angle of the rotation direction of the output shaft and a second detecting unit that detects linear/rotation displacement of the output shaft.

First, a first embodiment will be described.

An actuator will be described using FIG. 1. An actuator according to the first embodiment that performs a linear/rotation operation is disposed such that an X direction thereof becomes a downward direction of a vertical direction.

In a motor portion 1100a of a stator 1100, a cylindrical motor frame 1101 functioning as an armature core, a θ armature winding 1103, and an X armature winding 1104 are provided in a concentric shape. In the motor frame 1101, a motor terminal (not illustrated in the drawings) that externally supplies power to the θ armature winding 1103 and the X armature winding 1104 is provided.

As such, since the length of the actuator in a longitudinal direction can be decreased by disposing the θ armature winding 1103 and the X armature winding 1104 to overlap in a concentric shape, an output per unit volume can be increased.

A mover 1200 includes an output shaft 1201 and a field portion 1202, and the output shaft 1201 is made of stainless steel which is a non-magnetic material and is provided with a hollow hole 1205 penetrating a portion from the load side to the anti-load side. The output shaft 1201 is supported to linearly move in an X direction by ball splines 1106a provided in two places of flanges 1301a and 1301b of the load side and the anti-load side. The output shaft 1201 and the ball spline 1106a are supported to rotate in a θ direction by bearings 1106b provided in two places of the same portions as the output shaft 1201 and the ball spline 1106a, respectively, and can move in the θ direction and the X direction with respect to the stator 1100. The anti-load side of the output shaft 1201 is supported by the bearing 1106c and can move in the θ direction with respect to the stator 1100. A load (not illustrated in the drawings) is disposed on a tip of the output shaft 1201 and the load can be freely moved in the θ direction and the X direction.

At the load side and the anti-load side of the motor frame 1101, an outer ring of the bearing 1106b is fixed to an inner circumferential surface of the motor frame 1101, and on an inner ring of the bearing 1106b, the ball spline 1106a is disposed in a concentric circle with the bearing 1106b through a sleeve 1109. By supporting the load side and the anti-load side of the motor portion 1100a at both ends by a bearing unit 1106 including the ball spline 1106a and the bearing 1106b to linearly move in the X direction and rotate in the θ direction, the linear and the rotation can be performed with high precision.

Figure 2:
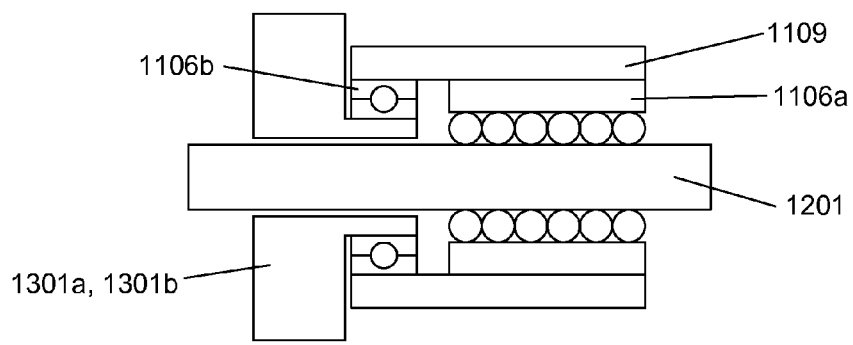
FIG. 2 is a lateral cross-sectional view illustrating the other support mechanism.

In the configuration of the ball spline 1106a and the bearing 1106b, on the inner ring of the bearing 1106b, the ball spline 1106a is disposed in a concentric circle with the bearing 1106b through the sleeve 1109. According to another example, as illustrated in FIG. 2, the inner ring of the bearing 1106b is fixed to the flange 1301a (1301b) and the outer ring of the bearing 1106b is connected to the ball spline 1106a through the sleeve 1109. By this configuration, the linear and the rotation can be performed with high precision by supporting the load side and the anti-load side of the output shaft 1201 at both ends by the bearing unit 1106 including the ball spline 1106a and the bearing 1106b to linearly move in the X direction and rotate in the θ direction.

The anti-load side of the output shaft 1201 is supported by the bearing 1106c, and the outer ring of the bearing 1106c is held by a bracket 1110 and is connected to one end of an arm 1111. The arm 1111 passes through an opening 1302 of the flange 1301b and is attached to a linear guide 1112 provided on an external surface of the motor frame 1101, and the linear scale 1401 is attached to the arm 1111. A linear sensor 1402 is disposed to face the linear scale 1401 and detects a linear operation of the output shaft 1201 in the X direction.

As such, the output shaft 1201 is supported by the ball splines 1106a of the load side and the anti-load side and the arm 1111 that is connected through the bearing 1106c is supported by the linear guide 1112. As a result, support stiffness increases. Therefore, linear support can be performed with high precision. The linear scale 1401 that is attached to the arm 1111 is supported by the linear guide 1112 and the arm 1111 is held by the outer ring of the bearing 1106c. Therefore, the length of an optical path with the linear sensor 1402 becomes the averaged clearance change of radial clearance of the bearing 1106c and axial clearance of the linear guide 1112, the clearance change can be suppressed to the clearance change of several micrometers, and the linear sensor 1402 can decrease detection error by the clearance change.

A collar 1403 is attached to the ball spline 1106a of the anti-load side of the output shaft 1201 and is rotatably supported to the bearing 1106b. A permanent magnet 1404a having a ring shape is attached to a cylindrical surface of the collar 1403. Magnetic detecting elements 1404b such as four MR elements or hall elements that are disposed equally on the outer circumference to face the permanent magnet 1404a with a void interposed therebetween are disposed, and a magnetic encoder 1404 is configured.

As such, the permanent magnet 1404a is rotatably supported by the bearings 1106b of the load side and the anti-load side of the output shaft 1201, and the length of the optical path becomes the averaged clearance change of the radial clearance of the bearing 1106b and is the magnetic gap change of several micrometers. Therefore, the detection error of the magnetic encoder can be reduced.

Figure 3:
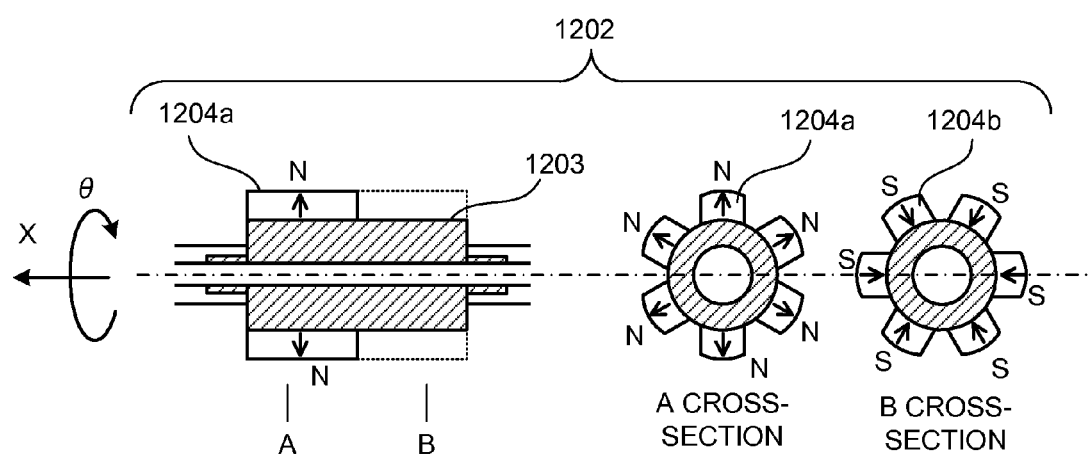
FIG. 3 is a cross-sectional view of a field portion according to the first embodiment.

FIG. 3 is a cross-sectional view of the field portion of the mover when viewed from the side and is a cross-sectional view viewed from the X direction. The cross-sectional view viewed from the X direction becomes a cross-sectional view of A and B portions of the cross-sectional view viewed from the side. An arrow (→) in the drawing indicates a magnetization direction of the permanent magnet and the polarity becomes S→N.

In the field portion 1202, plural permanent magnets (hereinafter, referred to as block magnets) 1204a and 1204b that have block shapes are provided on the outer circumference of a cylindrical field yoke 1203. The outer circumferential side of the block magnet 1204a is magnetized with an N pole and the inner circumferential side is magnetized with an S pole, and the block magnet 1204b is magnetized reversely from the block magnet 1204a. The block magnets 1204a and 1204b face the X armature winding 1104 with the void interposed therebetween.

Figure 4:
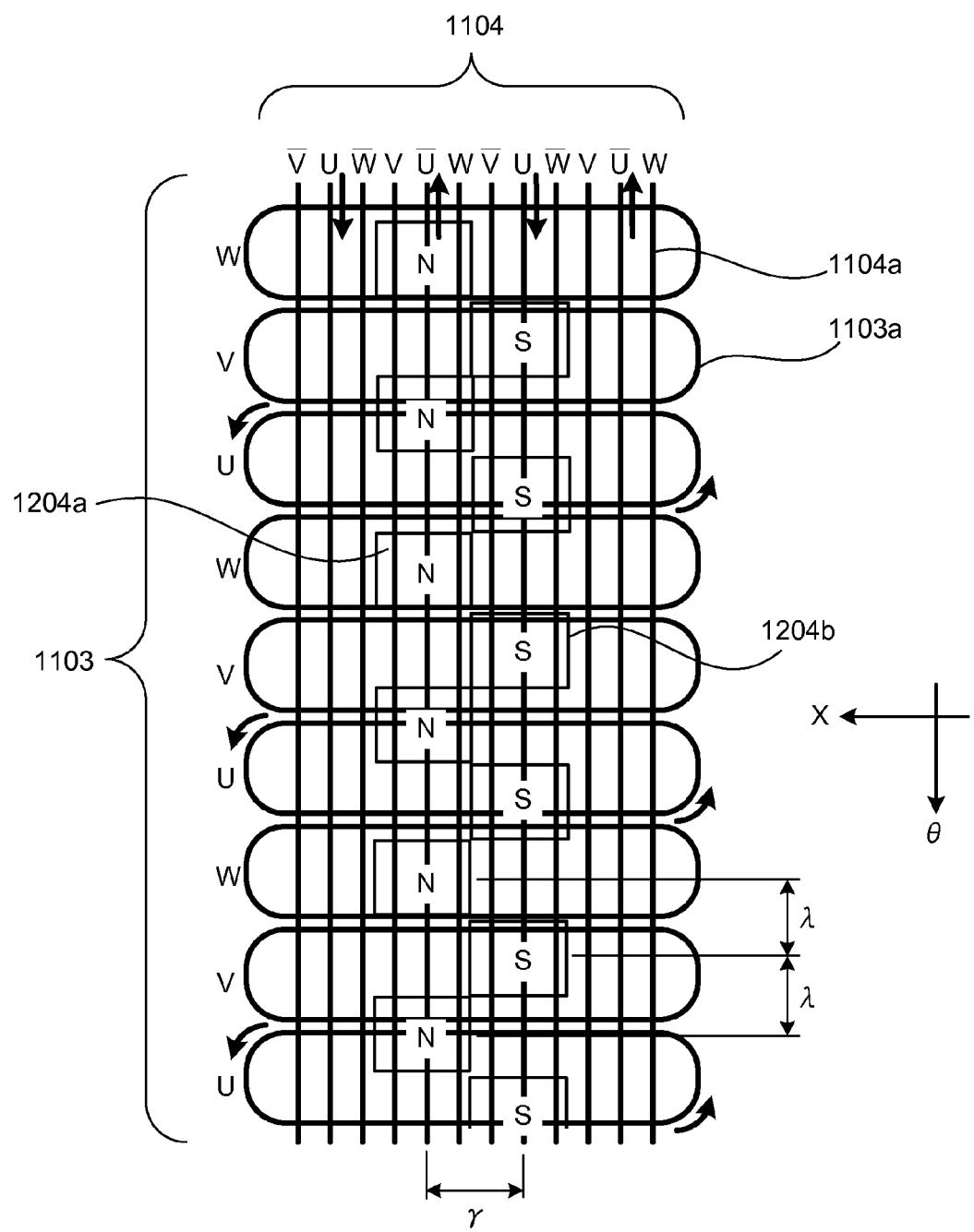
FIG. 4 is a development view illustrating an arrangement relationship of an armature winding and a permanent magnet in the first embodiment.

FIG. 4 is a development view illustrating an arrangement relationship of the armature winding and the permanent magnet in FIG. 3.

The number of each of the block magnets 1204a and 1204b is 6. The block magnets 1204a are disposed at the pitch of 2λ (λ is the pole pitch of the θ direction=electric angle of 180 degrees) in the θ direction and the block magnets 1204b are also disposed at the pitch of 2λ in the θ direction. The block magnets 1204a and 1204b are disposed to be shifted by λ in the θ direction and γ in the X direction (γ is the pole pitch of the X direction=electric angle of 180 degrees). Therefore, the number of magnetic poles of the field becomes 12 in the θ direction and becomes 2 in the X direction.

The θ armature winding 1103 and the X armature winding 1104 are disposed as illustrated simulatedly by a heavy black line with the void interposed between the block magnets 1204a and 1204b. In the θ armature winding 1103, concentrated winding coils (hereinafter, referred to as bale-type coils 1103a) where a coil end portion has a circle arc shape are provided by 3 for each of U, V, and W phases and are configured by a total of 9 coils. An interval of the bale-type coils 1103a in the θ direction is λ×4/3 (electric angle of 240 degrees). Since an interval of the bale-type coils 1103a of the same phase becomes an electric angle of 720 degrees, the three bale-type coils 1103a of the same phase are connected such that three directions of the current become the same. Meanwhile, in the X armature winding 1104, ring-type coils 1104a that are concentratedly wound in a cylindrical shape are provided by 4 for each of U, V, and W phases and are configured by a total of 12 coils. An interval of the ring-type coils 1104a in the X direction is γ/3 (electric angle of 60 degrees) and the entire length of the X armature winding 1104 in the X direction is 4γ (=γ/3×12). Since an interval of the ring-type coils 1104a of the same phase becomes γ (electric angle of 180 degrees), the four ring-type coils 1104a of the same phase are connected such that directions of the current become a forward rotation, a backward rotation, a forward rotation, and a backward rotation, respectively.

The actuator that has the above-described configuration generates torque in the mover 1200 with an action with the magnetic field generated by the block magnets 1204a and 1204b by flowing the current to the θ armature winding 1103. The actuator generates thrust force in the mover 1200 with an action with the magnetic field generated by the block magnets 1204a and 1204b by flowing the current to the X armature winding 1104. FIG. 3 is a diagram illustrating a state in which the current is supplied to the θ armature winding 1103 or the X armature winding 1104 with a phase where the U phase is maximized. The Lorentz force is generated by flowing the current in an arrow direction in the FIG. 3, and the mover 1200 generates the torque in a θ+direction and the thrust force in an X+ direction. In this way, the torque and the thrust force are generated directly in the mover 1200 and the rotation operation and the linear operation are performed.

The output shaft 1201 is made of the stainless steel to be the non-magnetic material and does not pass the magnetic flux. Therefore, the leakage magnetic flux of the field portion 1202 with respect to a detecting portion 1100b can be reduced and the detection error of the detecting portion 1100b that is generated by the leakage magnetic flux of the field portion 1202 can be reduced.

By providing the hollow hole 1205, air (cooling medium) can pass through the hollow hole 1205 and the output shaft 1201 can be cooled. The output shaft 1201 is thermally expanded by the heat generated from the motor portion 1100a. By cooling the output shaft 1201, the thermal deformation of the output shaft 1201 in the linear direction can be reduced and the position error of the output shaft 1201 in the linear direction can be reduced. The hollow hole 1205 can become a vacuum state and components can be absorbed into the tip of the load side of the output shaft 1201. The air in the hollow hole 1205 can be compressed through a joint 1207 and the components can be desorbed from the tip of the load side of the output shaft 1201.

Next, a second embodiment will be described.

An actuator according to the second embodiment will be described using FIG. 5.

In a motor portion 1100a of a stator 1100, a cylindrical motor frame 1101 functioning as an armature core, an θ armature winding 1103, and an X armature winding 1104 are provided in a concentric shape. In the motor frame 1101, a motor terminal (not illustrated in the drawings) that externally supplies power to the θ armature winding 1103 and the X armature winding 1104 is provided.

A mover 1200 includes an output shaft 1201 and a field portion 1202. In the field portion 1202, an X field portion 1202a and a θ field portion 1202b are disposed to be arranged in a longitudinal direction in a concentric shape. The X field portion 1202a is attached to the output shaft 1201 and the θ field portion 1202b is attached to a collar 1405 attached to the ball spline 1106a of the load side of the output shaft 1201. The output shaft 1201 is made of stainless steel which is a non-magnetic material and is provided with a hollow hole 1205 penetrating a portion from the load side to the anti-load side. The output shaft 1201 is supported to linearly move in an X direction by the ball splines 1106a provided in two places of flanges 1301a and 1301b of the load side and the anti-load side thereof. The output shaft 1201 and the ball splines 1106a are supported to rotate in a θ direction by bearings 1106b provided in two places of the same portions as the ball splines 1106a and the output shaft can move in the θ direction and the X direction with respect to the stator 1100. The anti-load side of the output shaft 1201 is supported by the bearing 1106c and can move in the θ direction with respect to the stator 1100. A load (not illustrated in the drawings) is disposed on a tip of the output shaft 1201 and the load can be freely moved in the θ direction and the X direction.

As such, by configuring the motor portion 1100a, a void of the X armature winding 1104 and the X field portion 1202a and a void of the θ armature winding 1103 and the θ field portion 1202b come close to each other and the length of a magnetic gap can be shortened. Therefore, an output can be increased. The length of the actuator in a longitudinal direction slightly increases. However, since the output of the actuator increases, an output per unit volume can be increased.

Since the configurations of the other support mechanism and the detecting portion of the output shaft are same as those of the first embodiment, the description thereof will not be repeated.

By this configuration, the output per unit volume can be increased and the output shaft is supported with high stiffness by the plural support mechanisms. Therefore, in the detecting portion, a problem such as the detection error according to the void change can be resolved In this embodiment, an optical linear sensor is used when the linear displacement of the X direction is detected. However, this configuration is only exemplary. For example, a sensor that detects the magnetic change may be used. Further, a magnetic sensor is used when a rotation angle of the θ direction is detected. However, this configuration is only exemplary. For example, a sensor that detects reflection (or transmission) of light may be used.

The ball spline or the ball bearing is used as the smooth support mechanism. However, a rotary ball spline that is configured by integrating the ball spline and the ball bearing may be used. The support mechanism may be changed according to needed precision of a support portion and a sliding bearing or a fluid bearing may be used.

Figure 5:
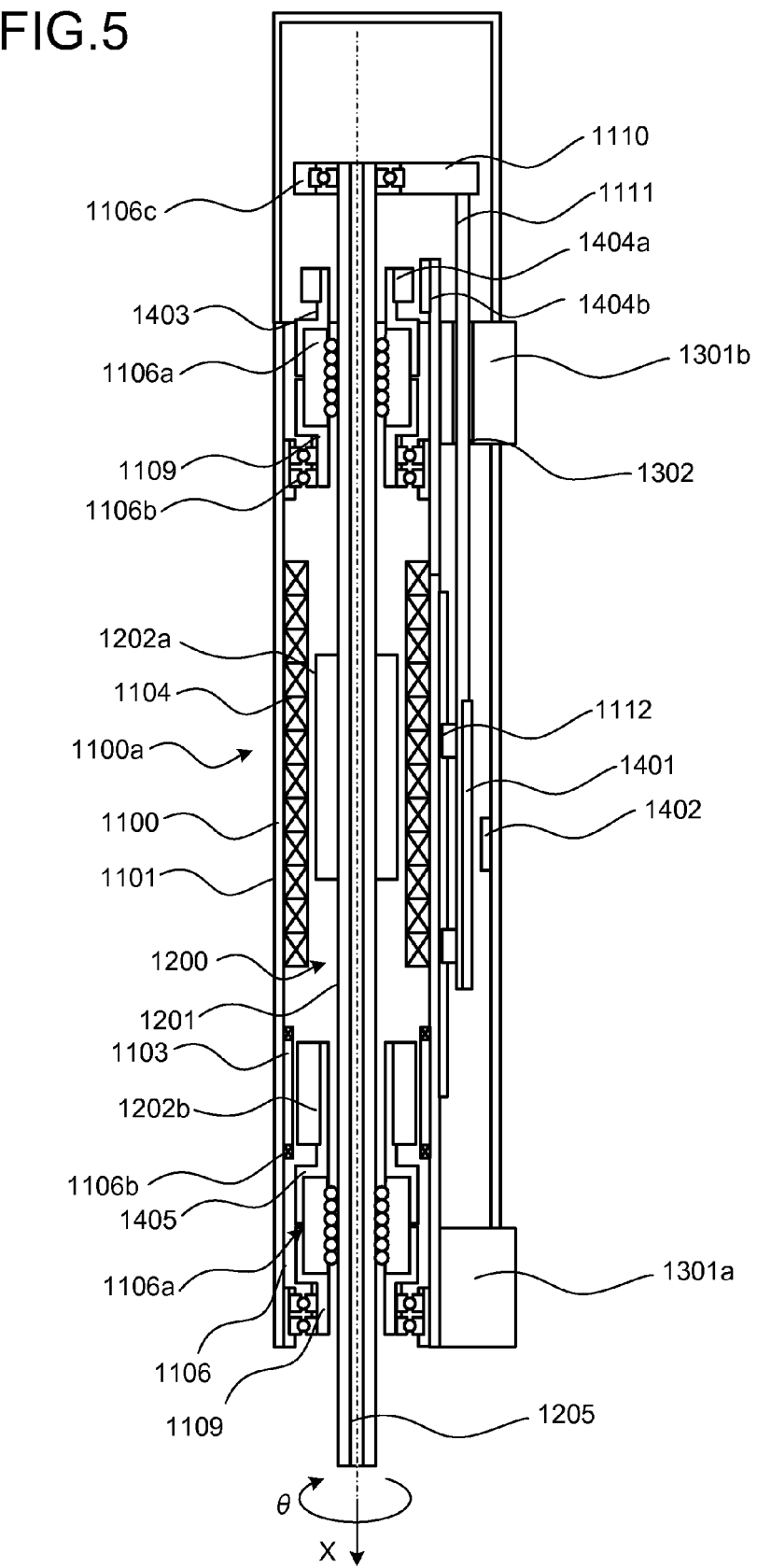
FIG. 5 is a lateral cross-sectional view of an actuator according to a second embodiment.

In the actuator according to this embodiment, in many cases, the output shaft is disposed such that the X direction of FIGS. 1 and 5 becomes a gravity rotation. In this case, if the power supply with respect to the motor portion 1100a is stopped, the output shaft may fall in the gravity rotation by the self weight of the mover 1200. Meanwhile, an elastic mechanism that generates the restitution force, for example, a helical spring is inserted between the bracket of the bearing 1106b of the anti-load side held by the frame 1101 and the holding portion 1110 of the bearing 1106c, or a stator core constituting an electric circuit between the X field portion 1202 and the X armature winding 1103 is formed in the X armature winding 1103 and the mover 1200 is held by the magnetic sucking force generated between the X filed portion 1202 and the X armature winding 1103.

In the actuator that is described in this embodiment, the operations of the linear direction and the rotation direction are realized while the width direction is narrowed. The actuator according to this embodiment is suitable when the plural actuators are connected in the width direction and the depth direction. At this time, the plural actuators are connected in the width direction and the depth direction such that the linear scale 1401 and the linear sensor 1402 to detect the position of the linear direction are positioned on the front surface. By connecting the plural actuators in the width direction and the depth direction according to the position relationship described above, the interval of the output shafts 1201 in the width direction can be narrowed.

Next, a third embodiment will be described.

Figure 6:
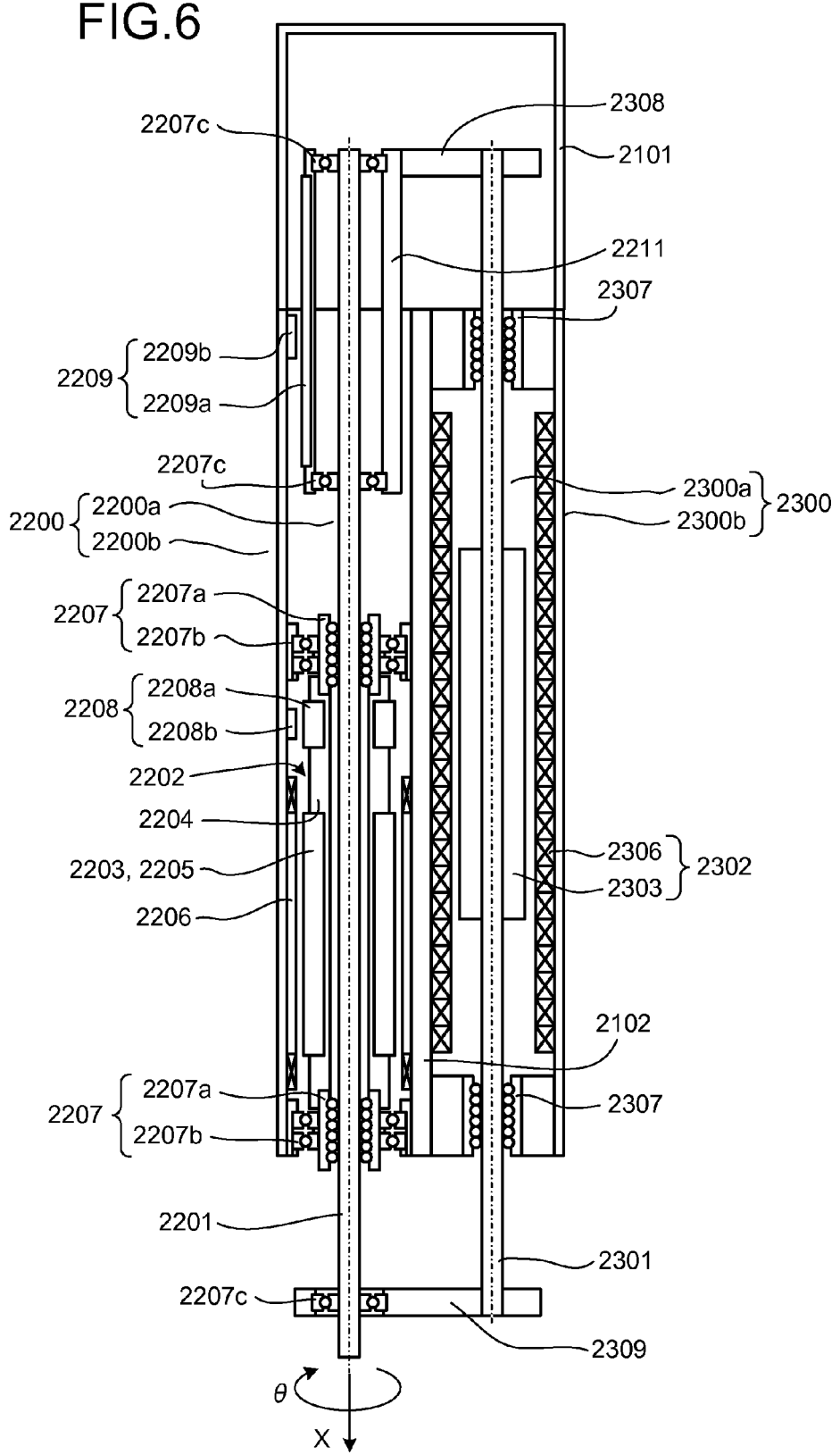
FIG. 6 is a lateral cross-sectional view of an actuator according to a third embodiment.

FIG. 6 is a lateral cross-sectional view of an actuator according to the third embodiment. The actuator will be described using FIG. 6.

In FIG. 6, the actuator according to the third embodiment that performs a linear/rotation operation includes a rotation driving portion 2200 and a linear driving portion 2300, and the rotation driving portion and the linear driving portion are disposed at the center in a motor frame 2101 in parallel in a left and right direction in the drawing with an intermediate frame 2102 interposed therebetween. In this case, the rotation driving portion and the linear driving portion are stored in the same case (not illustrated in the drawings).

The actuator is disposed such that an X direction in the drawing becomes a downward direction of a vertical direction and a θ direction becomes a rotation direction.

First, in the rotation driving portion 200, a θ-axis motor portion 2202 is disposed on the load side, and a rotation detecting portion 2208 that detects displacement of the rotation direction of the output shaft 2201 and a linear detecting portion 2209 that detects displacement of the linear direction of the output shaft 2201 are disposed on the anti-load side.

In the θ-axis motor portion 2202, a field portion 2203 including a θ armature winding 2206 that generates the rotation magnetic field in the rotation direction and constitutes the stator 2200b and a permanent magnet 2205 that is disposed to face the θ armature winding 2206 in a concentric shape with a magnetic void interposed therebetween and constitutes the mover 2200a is provided.

On the load side and the anti-load side of the θ-axis motor portion 2202, a θX bearing portion 2207 that includes one ball spline 2207a and two bearings 2207b is disposed. A collar 2204 is attached between the ball splines 2207a of the load side and the anti-load side and the θ-axis motor portion 2202 is fixed to the outer circumference of the collar 2204. In this state, the output shaft 2201 is supported by the θX bearing portion 2207 to linearly move in a longitudinal direction. The field portion 2203 that constitutes the θ-axis motor portion 2202 is supported to rotate in a radial rotation by the bearing 2207b fixed to the outer circumference of the ball spline 2207a through the collar 2204.

The rotation detecting portion 2208 is provided in the vicinity (anti-load side of the rotation driving portion in the drawing) of the θX bearing portion 2207 positioned at the anti-load side of the θ-axis motor portion 2202, and includes a θ encoder 2208a that is fixed to the outer circumference of the collar 2204 and a rotation sensor head 2208b that is fixed to the motor frame 2101.

The linear detecting portion 2209 includes a linear scale 2209a that is attached to a hollow cylindrical member 2211 rotatably supported to the output shaft 2201 through the bearing 2207c and a linear sensor head 2302 that is fixed to the inner side of the motor frame 2101.

In the motor frame 2101, a motor terminal (not illustrated in the drawings) that externally supplies power to the θ armature winding 2206 and the X armature winding 2306 is provided. In the motor frame 2101, a detector terminal (not illustrated in the drawings) that externally supplies power to the linear detecting portion 2209 and the rotation detecting portion 2208 and outputs a detection signal of a position X and an angle θ is provided.

The output shaft 2201 is made of stainless steel to be a non-magnetic material.

In the linear detecting portion 2300, an X-axis motor portion 2302 and ball splines 2307 that are provided on both ends of the X-axis motor portion 2302 and support the output shaft 2301 are disposed.

In the X-axis motor portion 2302, an X armature winding 2306 that generates the magnetic field in a linear direction and constitutes the stator 2300b and a field portion 2303 that is disposed to face the X armature winding 2306 in a concentric shape with a magnetic void interposed therebetween and is made of a permanent magnet attached to the output shaft 2301 constituting the mover 2300a are provided.

As such, the ball splines 2307a are disposed on the load side and the anti-load side of the X-axis motor portion 2302, respectively, and the output shaft 2301 where the X-axis motor portion 2302 is disposed can be freely moved in a linear direction while being supported at both ends by the ball splines 2307a.

Each of the load side and the anti-load side of the output shaft 2201 that is provided in the rotation driving portion 2200 is supported by the inner ring of the bearing 2207b attached to the ball spline 2207a of the outside of the output shaft 2201. The outer ring of the bearing 2207c that is supported to the load side of the output shaft 2201 is connected to one end of the arm 2309 that is provided on the load side of the output shaft 2201 of the linear driving portion 2300. The outer ring of the bearing 2207c that is supported to the anti-load side of the output shaft 2201 is held by the hollow cylindrical member 2211 (corresponding to a scale holder), and an end of the hollow cylindrical member 2211 is connected to one end of the arm 2308 that is provided on the anti-load side of the output shaft 2201 of the linear driving portion 2300.

Next, an operation will be described. In this configuration, torque is generated in the output shaft 2201 with an action with the magnetic field generated by the permanent magnet 2205 of the field portion 2203 by supplying the current to the θ armature winding 2206 of the rotation driving portion 2200. Further, thrust force is generated in the output shaft 2301 with an action with the magnetic field generated by the permanent magnet of the field portion 2203 by supplying the current to the X armature winding 2306 of the direct driving portion 2300.

When the current is supplied to only one rotation driving portion 2200, the inner ring of the bearing 2207b is fixed to the outer circumference of the ball splines 2207a of the θX bearings provided on the load side and the anti-load side of the output shaft 2201. For this reason, the output shaft 2201 that includes the field portion 2205 rotates about the θ armature winding 2206 and the θ encoder 2208a that is fixed to the outside of the ball spline 2207a rotates at the same time as the rotation of the output shaft. At this time, the linear scale 2209a that is attached to the outer ring of the bearing 2207c at the anti-load side of the output shaft 2201 through the hollow cylindrical member 2211 is stopped. However, the rotation sensor head 2208b that is disposed to face one θ encoder 2208a detects a rotation operation of a θ direction of the output shaft 2201.

When the current is supplied to only the other linear driving portion 2300, the output shaft 2301 linearly moves in an axial direction in an inner portion of the ball spline 2307 and the output shaft 2201 of the rotation driving portion 2200 that is connected to the load side and the anti-load side of the output shaft 2301 through the arms 2308 and 2309 linearly moves in an inner portion of the ball spline 2207a of the θX bearing of the rotation driving portion 2200. At this time, in the linear detecting portion 2209, the linear sensor head 2209b that is disposed to face the linear scale 2209a detects the linear operation of the X direction of the output shaft 2201.

If the current is supplied to both the rotation driving portion 2200 and the linear driving portion 2300, the output shaft 2201 rotates and the output shaft 2301 linearly moves at the same time as the rotation of the output shaft, and the rotation detection and the linear detection can be performed with high precision.

Therefore, in the actuator according to the third embodiment that performs the linear/rotation operation, the rotation driving portion and the linear driving portion are disposed in parallel, the load side and the anti-load side of the output shaft of the linear driving portion are supported by the ball splines, the output shafts of the load side and the anti-load side of the θ-axis motor portion is supported by the θX bearing portion including one ball spline and two bearings, and the arms that are provided on the ends of the load side and the anti-load side of the output shaft of the linear driving portion are connected to the ends of the load side and the anti-load side of the output shaft of the rotation driving portion. From this configuration, the entire length of the actuator in an axial rotation can be shortened, an output per unit volume can be increased, and a size of the actuator can be decreased.

If the current is supplied to the θ armature winding and the X armature winding, the heat is generated in each of the rotation driving portion and the linear driving portion. The output shaft that is provided for each of the rotation driving portion and the linear driving portion is axially shortened. Therefore, even though the output shaft is thermally expanded by the heat generated from the armature winding, the thermal deformation can be minimized, and position error of the output shaft in the linear direction and angle error of the output shaft in the rotation direction can be reduced.

The θX bearing portion is configured using one ball spline and two bearings and is disposed on both sides of the θ motor portion and the rotation detecting portion disposed on the load side of the output shaft. As a result, looseness or eccentricity of the output shaft in the rotation detecting portion can be reduced. Therefore, straightness or rotation deflection precision of the output shaft can be improved. Since the straightness or rotation deflection precision of the output shaft can be improved, the straightness of the linear scale of the linear detecting portion disposed on the output shaft and the rotation deflection precision of the θ encoder of the rotation detecting portion can be improved, and the position of the linear direction and the angle of the rotation direction can be detected with high precision.

In particular, the collar is attached to the ball spline of the load side of the output shaft, the permanent magnet is attached to the cylindrical surface of the collar, the magnetic detecting elements such as four MR elements or hall elements that are disposed equally on the outer circumference to face the permanent magnet with a void interposed therebetween are disposed, and a so-called magnetic encoder is configured. As such, the permanent magnet is rotatably supported to the bearings of the load side and the anti-load side of the output shaft, the length of the optical path becomes the averaged clearance change of radial clearance of the bearing and is becomes the clearance change of several micrometers. Therefore, the detection error of the magnetic encoder can be reduced.

The output shaft is made of the stainless steel to be the non-magnetic material and does not pass the magnetic flux. Therefore, lines of magnetic force by the leakage magnetic flux of the field portion pass the output shaft and reach the detecting portion. Since the output shaft does not allow the magnetic flux to go through the output shaft, the leakage magnetic flux of the field portion with respect to the detecting portion can be reduced, and the detection error of the detecting portion that is generated by the leakage magnetic flux of the field portion can be reduced.

Next, a fourth embodiment will be described.

Figure 7:
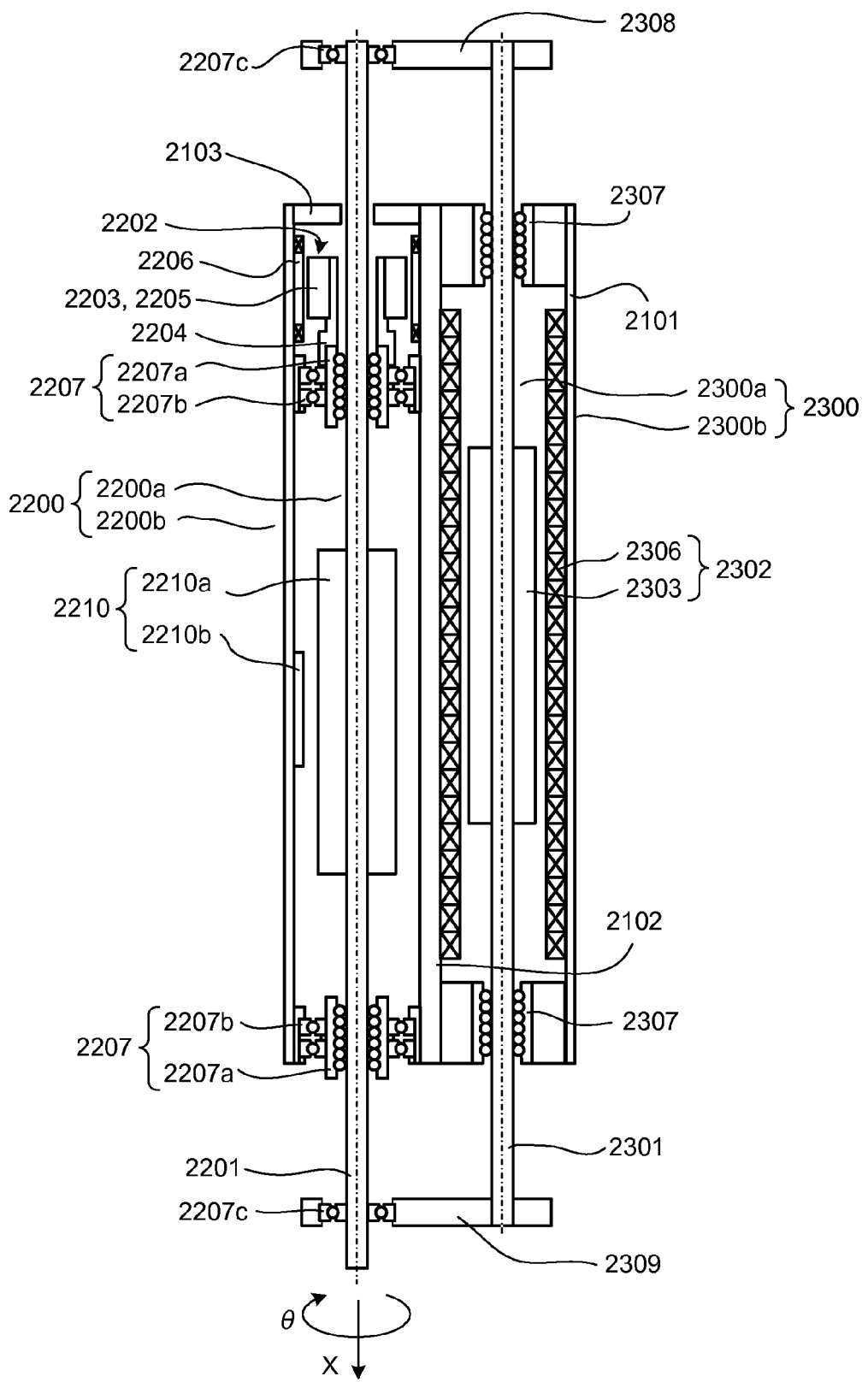
FIG. 7 is a lateral cross-sectional view of an actuator according to a fourth embodiment.

FIG. 7 is a lateral cross-sectional view of an actuator according to a fourth embodiment. Components of the fourth embodiment that are the same as those of the third embodiment are not repetitively described.

The actuator according to the fourth embodiment that performs the linear/rotation operation is different from the actuator according to the third embodiment in the following points.

That is, as a detecting portion of the actuator according to the fourth embodiment, a linear/rotation detecting portion 2210 that is obtained by integrating the linear detecting portion and the rotation detecting portion according to the third embodiment is configured. The so-called linear/rotation detecting portion 2210 is provided between the support mechanisms (ball spline 2207a and bearing 2207b) of the load side and the anti-load side of the rotation driving portion. The linear/rotation detecting portion 2210 includes a cylindrical linear/rotation scale 2210a that is fixed to the outer circumference of the output shaft 2201 and a linear/rotation sensor head 2210b that is fixed to the inner circumference of the motor frame 2101, and detects the displacement of the linear direction and the rotation direction.

In the rotation driving portion 2200, the θ field portion 2205 of the θ-axis motor portion 2203 is attached to the outside of the collar 2204 provided in the ball spline 2207a of the anti-load side of the output shaft 2201. The θ field portion 2205 of the θ-axis motor portion 2203 is attached to the motor frame 2101 such that the other θ armature winding 2206 forms a concentric shape with the θ field portion 2205.

Since the configuration of the linear driving portion 2300 according to the fourth embodiment is basically the same as that of the third embodiment, the description thereof will not be repeated.

Next, an operation will be described. In this configuration, torque is generated in the output shaft 2201 with an action with the magnetic field generated by the permanent magnet 2205 of the field portion 2203 by supplying the current to the θ armature winding 2206 of the rotation driving portion 2200. Further, thrust force is generated in the output shaft 2301 with an action with the magnetic field generated by the permanent magnet of the field portion 2303 by supplying the current to the X armature winding 2306 of the linear driving portion 2300.

When the current is supplied to only one rotation driving portion 2200, the output shaft 2201 is supported radially by the bearing 2207b provided in the ball spline 2207a of the θX bearing at the load side and the anti-load side. For this reason, the output shaft 2201 that includes the field portion 2205 rotates about the θ armature winding 2206. At this time, the linear/rotation scale 2210a of the linear/rotation detecting portion 2210 that is fixed to the output shaft 2201 rotates at the same time, and the linear/rotation sensor head 2210b that is disposed to face the direct rotation scale 2210a detects a rotation operation of a θ direction of the output shaft 2201.

When the current is supplied to only the other linear driving portion 2300, the output shaft 2301 linearly moves in an axial direction in an inner portion of the ball spline 2307. The output shaft 2201 of the rotation driving portion 2200 that is connected to the load side and the anti-load side of the output shaft 2301 through the arms 2308 and 2309 linearly moves in an inner portion of the ball spline 2207a of the θX bearing of the rotation driving portion 2200. At this time, in the linear detecting portion 2209, the linear sensor head 2209b that is disposed to face the linear scale 2209a detects the linear operation of the X direction of the output shaft 2201.

If the current is supplied to both the rotation driving portion 2200 and the linear driving portion 2300, the output shaft 2201 rotates and the output shaft 2301 linearly moves at the same time as the rotation of the output shaft, and the rotation detection and the linear detection can be performed with high precision.

Therefore, in the fourth embodiment, the linear/rotation detecting portion that includes the cylindrical linear/rotation scale fixed to the outer circumference of the output shaft and the linear/rotation sensor head fixed to the inner circumference of the first frame is provided between the load side and the anti-load side of the output shaft, the number of components is decreased by integrating the linear detecting portion and the rotation detecting portion as compared with the third embodiment, and a size of the actuator can be decreased. Therefore, looseness or eccentricity of the output shaft in the detecting portion can be reduced by decreasing the size. As a result, since the straightness or rotation deflection precision of the output shaft can be improved, the displacement of the linear direction and the rotation direction of the output shaft can be easily detected with the simple configuration.

Since the field portion of the θ-axis motor portion is attached to the outside of the collar provided in the ball spline of the anti-load side of the output shaft, the length of the magnetic gap is shortened by making the void of the θ armature winding and the θ field portion close. Therefore, an output can be increased. The length of the θ-axis motor in the longitudinal direction decreases and a size of the actuator can be decreased.

Next, a fifth embodiment will be described.

Figure 8:
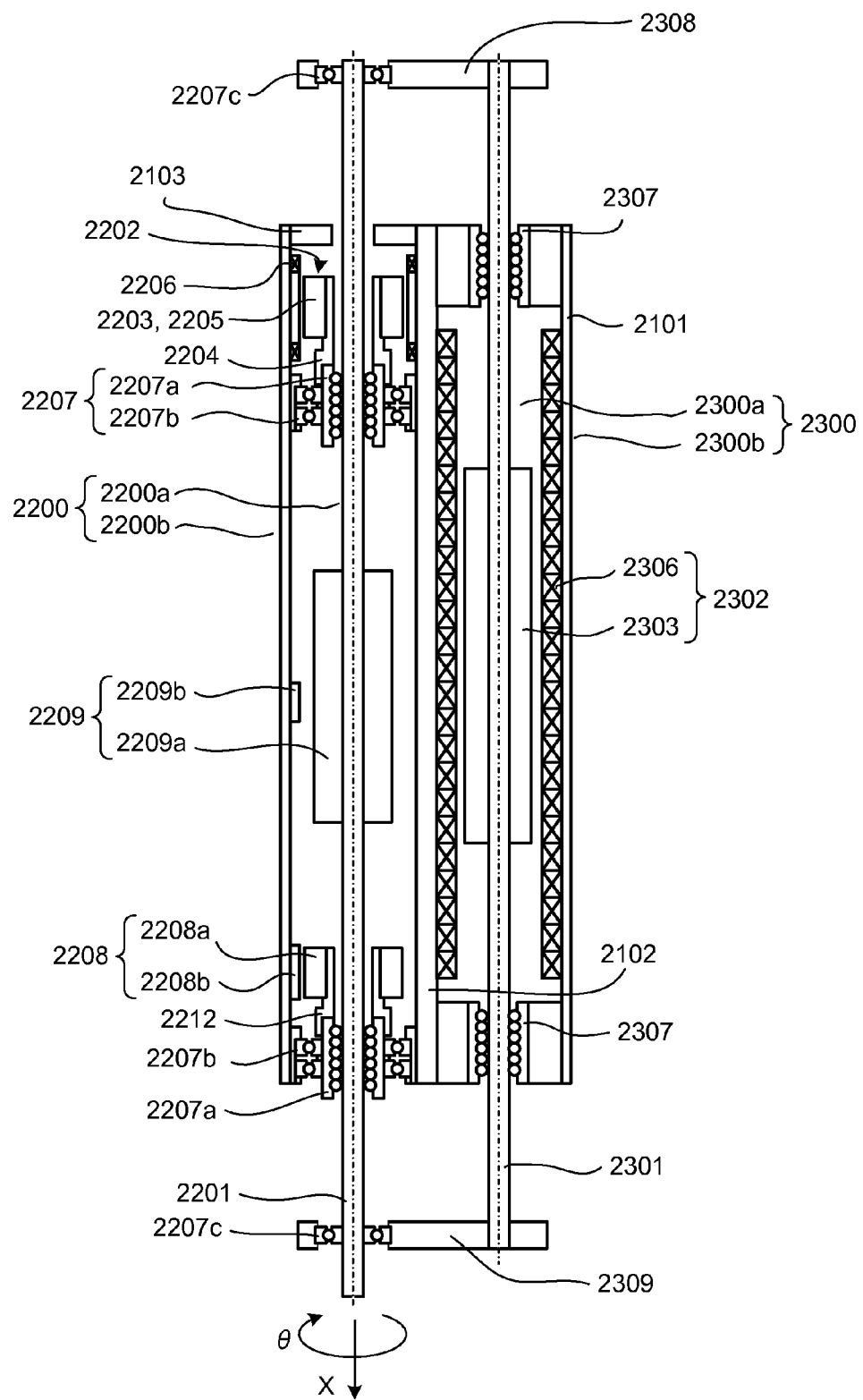
FIG. 8 is a lateral cross-sectional view of an actuator according to a fifth embodiment.

FIG. 8 is a lateral cross-sectional view of an actuator according to a fifth embodiment. Components of the fifth embodiment that are the same as those of the third embodiment are not repetitively described.

The actuator according to the fifth embodiment that performs the linear/rotation operation is different from the actuator according to the fourth embodiment in the following points.

That is, as a detecting portion of the actuator according to the fifth embodiment, a rotation detecting portion 2208 and a linear detecting portion 2209 are individually configured. The θ encoder 2208a that constitutes the rotation detecting portion 2208 is attached to the outside of the collar 2212 provided in the ball spline 2207a of the load side of the output shaft 2201, and the other rotation sensor head 2208b is attached to the motor frame 2101 and detects the displacement of the rotation direction. The cylindrical linear scale 2209a that constitutes the linear detecting portion 2209 is fixed between the load side and the anti-load side of the output shaft 2201 and the other linear sensor head 2209b is attached to the motor frame 2101.

In the rotation driving portion 2200, the θ field portion 2205 of the θ motor portion 2203 is attached the outside of the collar 2204 provided in the ball spline 2207a of the anti-load side of the output shaft 2201, and the other θ armature winding 2206 is attached to the motor frame 2101 to form a concentric shape with the θ field portion 2205.

Since the configuration of the linear driving portion 300 according to the fifth embodiment is basically the same as that of the fourth embodiment, the description thereof will not be repeated.

Since an operation of the fifth embodiment is basically the same as that of the fourth embodiment, the description thereof will not be repeated.

Therefore, in the fifth embodiment, the θ encoder that constitutes the rotation detecting portion is attached to the collar provided in the ball spline of the load side of the output shaft and the rotation sensor head is attached to the motor frame, and the linear scale that constitutes the linear detecting portion is fixed between the load side and the anti-load side of the output shaft and the linear sensor head is attached to the motor frame. Thereby, looseness or eccentricity of the output shaft in the detecting portion can be reduced. As a result, since the straightness or rotation deflection precision of the output shaft can be improved, the displacement of the linear direction and the rotation direction of the output shaft can be easily and precisely detected with the simple configuration.

The field portion of the θ-axis motor is attached to the outside of the collar provided in the ball spline of the anti-load side of the output shaft, and the θ armature winding is attached to the motor frame to form a concentric shape with the θ field portion. Therefore, the length of the magnetic gap is shortened by making the void of the θ armature winding and the θ field portion close, and an output can be increased. The length of the θ-axis motor in the longitudinal direction decreases and a size of the actuator can be decreased.

In this embodiment, the optical linear sensor is used when the linear displacement of the X direction is detected. However, this configuration is only exemplary. For example, a sensor that detects the magnetic change may be used. Further, the magnetic sensor is used when the rotation angle of the θ direction is detected. However, this configuration is only exemplary. For example, a sensor that detects reflection (or transmission) of light may be used.

The ball spline or the ball bearing is used as the smooth support mechanism. However, a rotary ball spline that is configured by integrating the ball spline and the ball bearing may be used. The support mechanism may be changed according to needed precision of a support portion, and a sliding bearing or a fluid bearing may be used.

Next, a sixth embodiment will be described.

Figure 9:
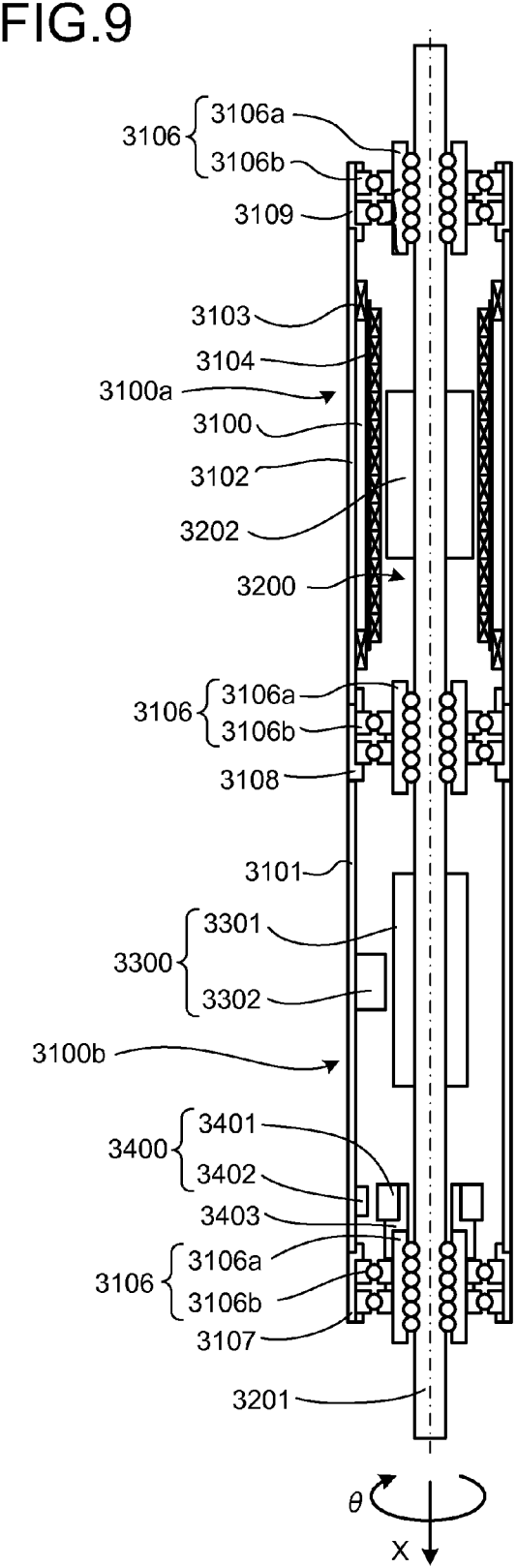
FIG. 9 is a lateral cross-sectional view of an actuator according to a sixth embodiment.

FIG. 9 is a lateral cross-sectional view of an actuator according to the sixth embodiment. The actuator will be described using FIG. 9.

In FIG. 9, the actuator according to the sixth embodiment that performs the linear/rotation operation includes a stator 3100 and a mover 3200. In the stator 3100 and the mover 3200 of the actuator, the detecting portion 3100b is disposed on the load side of the output shaft 3201 and the motor portion 3100a is disposed on the anti-load side. The actuators according to the sixth embodiment and embodiments to be described below are disposed such that an X direction in the drawings becomes a downward direction of a vertical direction and a θ direction becomes a rotation direction.

At the side of the stator 3100 of the motor portion 3100a, a cylindrical second frame 3102 that functions an armature core, a θ armature winding 3103 that generates the magnetic field in a rotation direction, and an X armature winding 3104 that generates the magnetic field in a linear direction are provided to overlap in a concentric shape. In the second frame 3102, a motor terminal (not illustrated in the drawings) that externally supplies power to the θ armature winding 3103 and the X armature winding 3104 is provided. Meanwhile, at the side of the mover 3200 of the motor portion 3100a, the field portion 3202 that is disposed to face the inner side of the X armature winding 3104 with a magnetic void interposed therebetween is provided in the output shaft 3201. The output shaft 3201 is made of stainless steel to be a non-magnetic material.

As such, in the motor portion 3100a, the length of the actuator in the longitudinal direction can be shortened by disposing the θ armature winding 3103 and the X armature winding 3104 to overlap in a concentric shape. Therefore, an output per unit volume can be increased.

The detecting portion 3100b includes a linear detecting portion 3300 that detects displacement of a linear direction of the output shaft 3201 and a rotation detecting portion 3400 that detects displacement of a rotation direction of the output shaft 3201.

The linear detecting portion 3300 includes a cylindrical optical linear scale 3301 that is fixed to the outer circumference of the output shaft 3201 and an optical linear sensor head 3302 that is fixed to the inner circumference of the first frame 3101. In the rotation detecting portion 3400, a θ encoder 3401 that is fixed to the ball spline 3106a of a θX bearing portion 3106 to be described below through the collar 3403 and a rotation sensor head 3402 that is fixed to the first frame 3101 are disposed. In the θ encoder 3401 that constitutes the rotation detecting portion 3400, a permanent magnet is used. In the rotation sensor head 3402, the permanent magnet is attached to the cylindrical surface of the collar, magnetic detecting elements such as four MR elements or hall elements that are disposed equally on the outer circumference at the inner side of the first frame 3101 to face the permanent magnet with a void interposed therebetween are used, and a so-called magnetic encoder is configured. In the first frame 3101, a detector terminal (not illustrated in the drawings) that externally supplies power to the linear detecting portion 3300 and the rotation detecting portion 3400 and outputs a detection signal of a position X and an angle θ is provided.

In the support mechanism, a load-side bracket 3107 is disposed on the load side of the first frame 3101 where the detecting portion 3100b is disposed and an anti-load-side bracket 3108 is disposed on the anti-load side. In each of the load-side bracket 3107 and the anti-load-side bracket 3108, a θX bearing portion 3106 that includes one ball spline 3106a and two bearings 3106b is disposed. An end bracket 3109 is provided on the anti-load side of the second frame 3102 where the motor portion 3100a is disposed, and a θX bearing portion 3106 that includes one ball spline 3106a and one bearing 3106b is disposed on the inner circumference of the end bracket 3109.

As such, the load side of the output shaft 3201 is supported to linearly move in the X direction by the ball splines 3106a constituting the θX bearing portions 3106 provided in the two places of the load-side bracket 3107 and the anti-load-side bracket 3108 of the first frame 3101. The output shaft 3201 and the ball spline 3106a are supported to rotate in a θ direction by the bearings 3106b provided in the two places of the same portions as the ball splines 3106a. Thereby, the output shaft 3201 where the detecting portion 3100b is disposed with respect to a portion of the first frame 3101 in the stator 3100 is supported at both ends, and a rotation operation in the θ direction and a linear operation in the X direction can be freely performed. Since the θ encoder 3401 is provided in a portion of the ball spline constituting the θX bearing portion 3106 at the load side of the output shaft 3201, the length of the load side of the output shaft 3201 that constitutes the detecting portion can be shortened. A load (not illustrated in the drawings) is provided on a tip of the output shaft 3201, and the load can be freely moved in the θ direction and the X direction.

The anti-load side of the output shaft 3201 is supported to linearly move in the X direction by the ball splines 3106a constituting the θX bearing portions 3106 provided in the two places of the anti-load-side bracket 3108 of the first frame 3101 and the end bracket 3109 of the second frame 3102. The output shaft 3201 and the ball spline 3106a are supported to rotate in the θ direction by the bearings 3106b provided in the two places of the same portions as the ball splines 3106a. Thereby, the output shaft 3201 where the motor portion 3100a is disposed with respect to a portion of the second frame 3102 in the stator 3100 is supported at both ends, and the load can be freely moved in the θ direction and the X direction.

Figure 10:
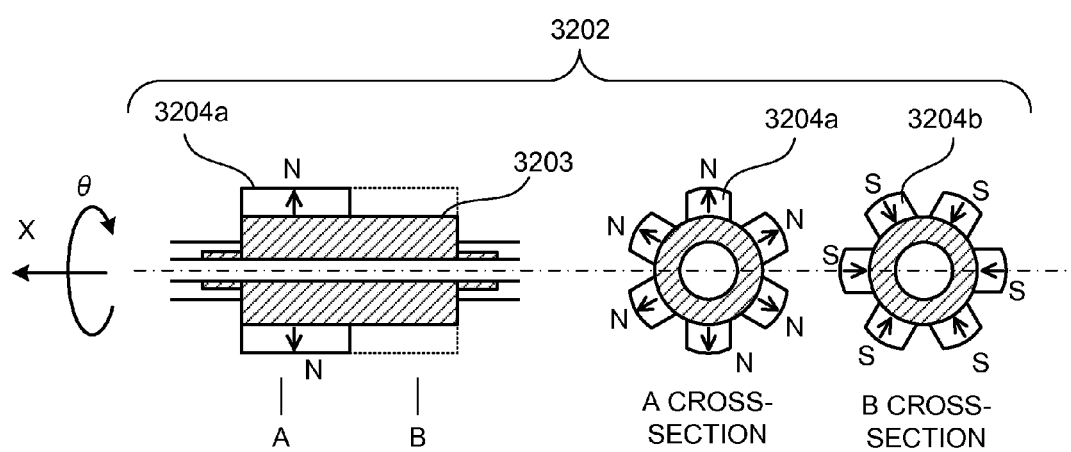
FIG. 10 is a cross-sectional view of a field portion according to the sixth embodiment.

FIG. 10 is a cross-sectional view of the field portion of the mover when viewed from the side and is a cross-sectional view viewed from the X direction. The cross-sectional view viewed from the X direction becomes a cross-sectional view of A and B portions of the cross-sectional view viewed from the side. An arrow (→) in the drawing indicates a magnetization direction of the permanent magnet and the polarity becomes S→N.

In the field portion 3202, plural permanent magnets (hereinafter, referred to as block magnets) 3204a and 3204b that have block shapes are provided on the outer circumference of a cylindrical field yoke 3203. The outer circumferential side of the block magnet 3204a is magnetized with an N pole and the inner circumferential side is magnetized with an S pole, and the block magnet 3204b is magnetized reversely from the block magnet 3204a. The block magnets 3204a and 3204b face the X armature winding 3104 with the void interposed therebetween.

Figure 11:
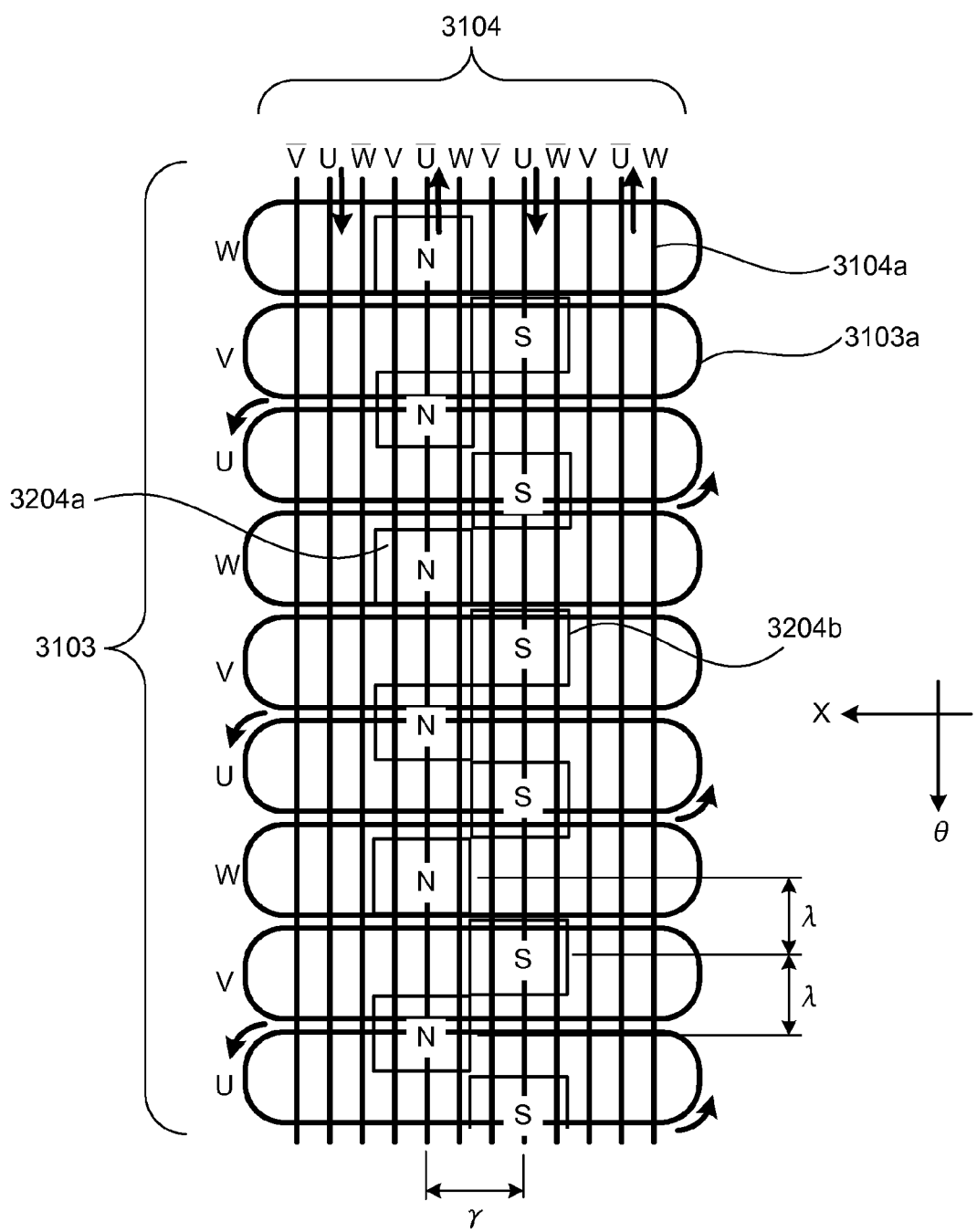
FIG. 11 is a development view illustrating an arrangement relationship of an armature winding and a permanent magnet in the sixth embodiment.

FIG. 11 is a development view illustrating an arrangement relationship of the armature winding and the permanent magnet in FIG. 10.

The number of each of the block magnets 3204a and 3204b is 6. The block magnets 3204a are disposed at the pitch of 2λ (λ is the pole pitch of the θ direction=electric angle of 180 degrees) in the θ direction and the block magnets 3204b are also disposed at the pitch of 2λ in the θ direction. The block magnets 3204a and 3204b are disposed to be shifted by λ in the θ direction and γ in the X direction (γ is the pole pitch of the X direction=electric angle of 180 degrees). Therefore, the number of magnetic poles of the field becomes 12 in the θ direction and becomes 2 in the X direction.

The θ armature winding 3103 and the X armature winding 3104 and the block magnets 3204a and 3204b are disposed as illustrated simulatedly by a black thick line with the void interposed therebetween. In the θ armature winding 3103, concentrated winding coils (hereinafter, referred to as bale-type coils 3103a) where a coil end portion has a circle arc shape are provided by 3 for each of U, V, and W phases and are configured by a total of 9 coils. An interval of the bale-type coils 3103a in the θ direction is λ×4/3 (electric angle of 240 degrees). Since an interval of the bale-type coils 3103a of the same phase becomes an electric angle of 720 degrees, the three bale-type coils 3103a of the same phase are connected such that three directions of the current become the same. Meanwhile, in the X armature winding 3104, ring-type coils 3104a that are concentratedly wound in a cylindrical shape are provided by 4 for each of U, V, and W phases and are configured by a total of 12 coils. An interval of the ring-type coils 3104a in the X direction is γ/3 (electric angle of 60 degrees) and the entire length of the X armature winding 3104 in the X direction is 4γ (=γ/3×12). Since an interval of the ring-type coils 3104a of the same phase becomes γ (electric angle of 180 degrees), the four ring-type coils 3104a of the same phase are connected such that directions of the current become a forward rotation, a backward rotation, a forward rotation, and a backward rotation, respectively.

Next, an operation will be described. The actuator that has the above-described configuration generates torque in the mover 3200 with an action with the magnetic field generated by the block magnets 3204a and 3204b by flowing the current to the θ armature winding 3103, and generates thrust force in the mover 3200 with an action with the magnetic field generated by the block magnets 3204a and 3204b by flowing the current to the X armature winding 3104. FIG. 11 is a diagram illustrating a state in which the current is supplied to the θ armature winding 3103 or the X armature winding 3104 with a phase where the U phase is maximized. The Lorentz force is generated by flowing the current in an arrow direction in FIG. 11, and the mover 3200 generates the torque in a θ+ rotation and the thrust force in an X+ rotation. In this way, the torque and the thrust force are directly generated in the mover 3200 and the rotation operation and the linear operation are performed.

As described above, in the sixth embodiment, the detecting portion 3100b is disposed on the load side and the motor portion 3100a is disposed on the anti-load side, the θX bearing portion 3106 is configured using one ball spline 3106a and two bearings 3106b, the θX bearing portion 3106 is provided at the load side and the anti-load side of the first frame 3101 and the anti-load side of the second frame 3102 such that the θX bearing portion 3106 is supported at both sides of the detecting portion 3100b and is supported at both sides of the motor portion 3100a, and the rotation detecting portion 3400 including the θ encoder 3401 that is attached to the ball spline 3106a of the load side of the output shaft 3201 through the collar 3403 and a rotation sensor head 3402 that is equally disposed on the circumference in the first frame 3101 to face the θ encoder 3401 with a void interposed therebetween is provided.

Therefore, in the sixth embodiment, in the motor portion, since the length of the actuator in a longitudinal direction can be shortened by disposing the θ armature winding and the X armature winding to overlap in a concentric shape, an output per unit volume can be increased, and an actuator having a high output can be provided.

The θX bearing portion is configured using one ball spline and two bearings and is disposed on both sides of the load side and the anti-load side of the detecting portion. As a result, looseness or eccentricity of the output shaft in the detecting portion can be reduced and straightness or rotation deflection precision of the output shaft can be improved. Since the straightness or rotation deflection precision of the output shaft can be improved, the straightness of the linear scale of the linear detecting portion and the rotation deflection precision of the rotation detecting portion that are disposed on the output shaft can be improved, and the position of the linear direction and the angle of the rotation direction can be detected with high precision.

The end bracket is disposed on the anti-load side of the motor portion and the output shaft is supported by the θX bearing portion, and this configuration becomes equivalent to the configuration where the θX bearing portion is disposed on both sides of the load side and the anti-load side of the motor portion. Therefore, straightness or eccentricity of the output shaft can be improved. The looseness or eccentricity of the output shaft can be reduced and straightness or rotation deflection precision of the output shaft can be improved.

In addition to the configuration where the detecting portion is disposed on the load side of the output shaft and the motor portion is disposed on the anti-load side, the θ encoder is provided in the portion of the ball spline that constitutes the θX bearing portion at the load side of the output shaft. Therefore, the distance between a load (not illustrated in the drawings) provided in the tip of the output shaft constituting the detecting portion and the detecting portion can be reduced. For example, when the current is supplied to the θ armature winding or the X armature winding, the heat is generated in the motor portion. Even though the anti-load side of the output shaft is thermally expanded by the heat generated from the motor portion, the distance between the load (not illustrated in the drawings) and the detecting portion at the load side of the output shaft can be decreased. Therefore, the position error of the output shaft in the linear direction can be decreased by decreasing the thermal deformation of the output shaft in a linear direction.

By disposing the magnetic encoder including the θ encoder made of the permanent magnet provided in the portion of the ball spline of the load side of the output shaft and the magnetic encoder composed of the magnetic detecting elements made of the MR elements with the void interposed between the θ encoder and the MR elements, the θ encoder is rotatably supported by the bearings of the load side and the anti-load side of the output shaft. Thereby, the radial clearance of the bearing becomes the averaged clearance change, the clearance is the change of the magnetic gap of several micrometers, and the detection error of the magnetic encoder can be alleviated.

When the field portion is assembled, the block magnets are magnetized and the field portion needs to be handled with attention. When the output shaft is assembled, the assembly affects detection precision of the linear/rotation operation and the linear scale needs to be attached with attention. By divisionally configuring the output shaft and the field portion, the assembly of the field portion and the assembly of the output shaft can be performed by different processes and the assembly work is facilitated.

Since the output shaft is configured using the ball spline shaft to be precisely processed, the manufacturing cost of the output shaft can be decreased by decreasing the length of the output shaft.

The output shaft is made of the stainless steel to be the non-magnetic material and does not pass the magnetic flux. Therefore, lines of magnetic force by the leakage magnetic flux of the field portion pass the output shaft and reach the detecting portion. Since the output shaft does not allow the magnetic flux to pass through the output shaft, the leakage magnetic flux of the field portion with respect to the detecting portion can be reduced, and the detection error of the detecting portion that is generated by the leakage magnetic flux of the field portion can be reduced.

In the actuator according to this embodiment described above, the detection error of the position of the linear direction and the angle of the rotation direction of the output shaft can be minimized, and the position and the angle can be detected with high precision. Therefore, a rotation operation and a linear operation with high precision can be realized by one actuator.

Next, a seventh embodiment will be described.

Figure 12:
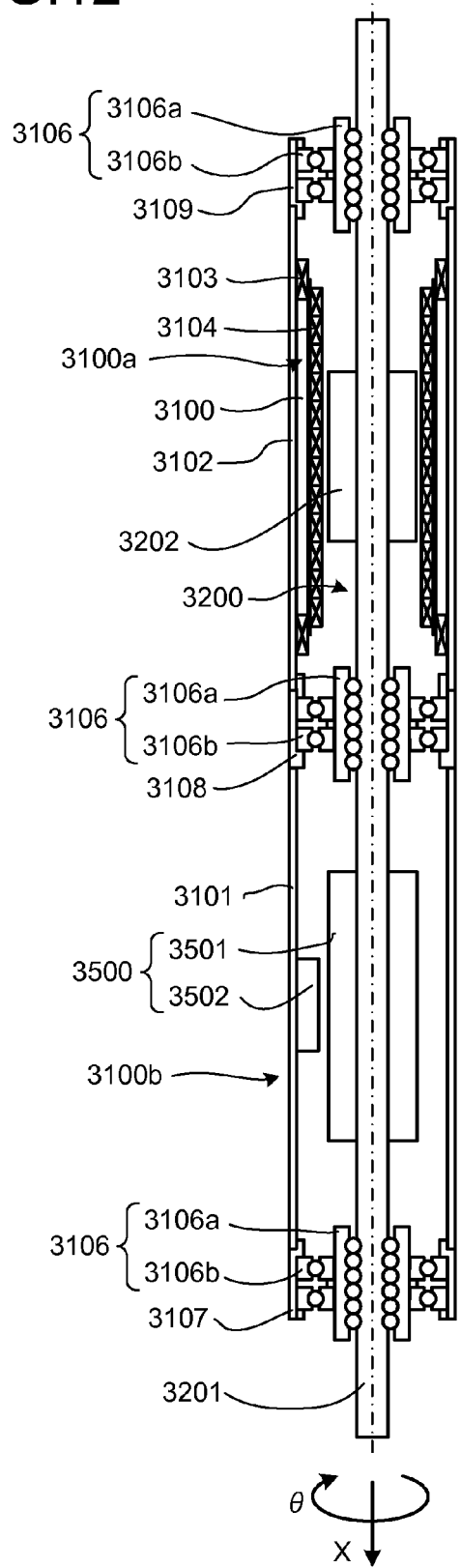
FIG. 12 is a lateral cross-sectional view of an actuator according to a seventh embodiment.

FIG. 12 is a lateral cross-sectional view of an actuator according to the seventh embodiment. Components of the seventh embodiment that are the same as those of the sixth embodiment are not repetitively described.

The actuator according to the seventh embodiment that performs the linear/rotation operation is different from the actuator according to the sixth embodiment in the following points.

That is, the detecting portion according to the sixth embodiment includes a linear detecting portion that detects displacement of the linear direction of the output shaft and a rotation detecting portion that detects displacement of the rotation direction of the output shaft. Meanwhile, a detecting portion according to the seventh embodiment includes a linear/rotation detecting portion 3500 that is obtained by integrating the linear detecting portion and the rotation detecting portion according to the sixth embodiment. The so-called linear/rotation detecting portion 3500 includes a cylindrical linear/rotation scale 3501 that is fixed to the outer circumference of the output shaft 3201 and a linear/rotation sensor head 3502 that is fixed to the inner circumference of the first frame 3101, and detects displacement of the output shaft 3201 in the linear direction and the rotation direction.

In the first frame 3101, a detecting terminal (not illustrated in the drawings) that externally supplies power to the linear/rotation detecting portion 3500 and outputs a detection signal of the position X and the angle θ is provided.

The mover according to the seventh embodiment includes the output shaft, the detecting portion, and the motor portion b, the θ armature winding and the X armature winding of the motor portion are disposed to be arranged in a longitudinal direction in a concentric shape, and the θX bearing portion supports the output shaft between the load side and the anti-load side of the detecting portion and between the load side and the anti-load side of the motor portion. Since these points are the same as those of the sixth embodiment, the description will not be repeated.

Since an operation of the seventh embodiment is basically the same as that of the sixth embodiment, the description thereof will not be repeated.

Therefore, in the seventh embodiment, as a detecting portion of the actuator, a linear/rotation detecting portion that includes the cylindrical linear/rotation scale fixed to the outer circumference of the output shaft and the linear/rotation sensor head fixed to the inner circumference of the first frame is provided, the number of components is decreased by integrating the linear detecting portion and the rotation detecting portion as compared with the sixth embodiment, and a size of the actuator can be decreased. Therefore, looseness or eccentricity of the output shaft in the detecting portion can be reduced by decreasing the size. As a result, since the straightness or rotation deflection precision of the output shaft can be improved, the displacement of the linear direction and the rotation direction of the output shaft can be easily and precisely detected with the simple configuration.

Next, an eighth embodiment will be described.

Figure 13:
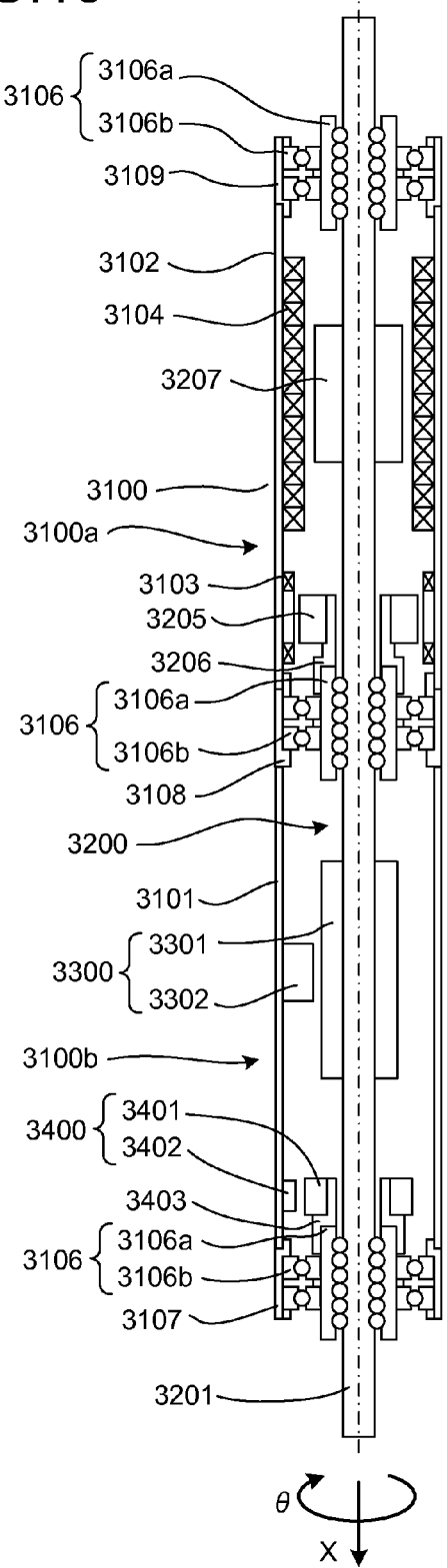
FIG. 13 is a lateral cross-sectional view of an actuator according to an eighth embodiment.

FIG. 13 is a lateral cross-sectional view of an actuator according to the eighth embodiment. Components of the eighth embodiment that are the same as those of the sixth embodiment are not repetitively described.

The actuator according to the eighth embodiment that performs the linear/rotation operation is different from the actuator according to the sixth embodiment in the following points.

That is, the motor portion according to the sixth embodiment includes an armature portion where the θ armature winding and the X armature winding are disposed in the second frame to overlap in a concentric shape and a field portion that is disposed to face the armature portion. Meanwhile, in the motor portion 3100a according to the eighth embodiment, the θ motor portion including the θ armature winding 3103 and the θ field portion 3205 and the X motor portion including the X armature winding 3104 and the X field portion 3207 are disposed in the second frame 3102 to be arranged in series in a longitudinal direction of the output shaft 3201. In particular, the X field portion 3207 of the X motor portion is attached to the output shaft 3201, the θ field portion 3205 of the θ motor portion is attached to the collar 3206 provided on the outer circumference of the ball spline 3106a positioned at the side of the anti-load side bracket 3108 of the output shaft 3201, and the other θ armature winding 3103 is attached to the second frame 3102.

The configuration where the θX bearing portion according to the eighth embodiment supports the output shaft between the load side and the anti-load side of the detecting portion and between the load side and the anti-load side of the motor portion is basically the same as that of the sixth embodiment. Therefore, the description thereof will not be repeated.

Since an operation of the eighth embodiment is basically the same as that of the sixth embodiment, the description thereof will not be repeated.

Therefore, in the eighth embodiment, the θ motor portion including the θ armature winding and the θ field portion and the X motor portion including the X armature winding and the X field portion are disposed to be arranged in series in a longitudinal direction in a concentric shape. In the eighth embodiment, the field portion of the X motor portion is attached to the output shaft and the θ field portion is attached to the collar provided in the ball spline positioned at the side of the anti-load side bracket of the output shaft. Therefore, the length of the magnetic gap is shortened by making the void of the X armature winding and the X field portion and the void of the θ armature winding and the θ field portion close. Therefore, an output can be increased. The length of the actuator in the longitudinal direction slightly increases. However, since an output of the actuator increases, an output per unit volume can be increased.

Next, a ninth embodiment will be described.

Figure 14:
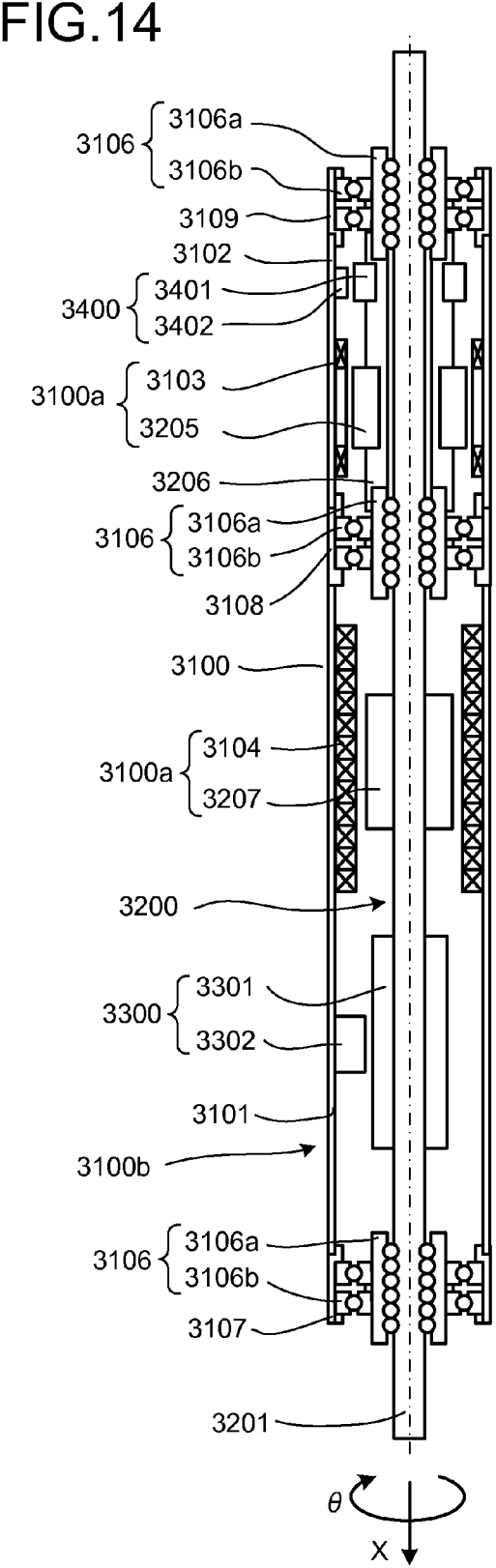
FIG. 14 is a lateral cross-sectional view of an actuator according to a ninth embodiment.

FIG. 14 is a lateral cross-sectional view of an actuator according to a ninth embodiment. Components of the ninth embodiment that are the same as those of the sixth to eighth embodiments are not repetitively described.

The actuator according to the ninth embodiment that performs the linear/rotation operation is different from the actuators according to the sixth to eighth embodiments in the following points.

That is, with respect to the stator 3100 and the mover 3200 of the actuators according to the sixth to eighth embodiments, a detecting portion 3100b that detects displacement of a linear direction and a rotation direction is disposed on the load side of the output shaft 3201 and a motor portion 3100a for linear/rotation driving is disposed on the anti-load side. Meanwhile, in the ninth embodiment, the linear detecting portion 3300 including the linear scale 3301 and the linear sensor head 3302 and the X motor portion including the X armature winding 3104 and the X field portion 3207 are provided at the load side of the output shaft 3201. Further, the θ motor portion including the θ armature winding 3103 and the θ field portion 3205 and the rotation detecting portion 3400 including the θ encoder 3401 and the rotation sensor head 3402 are disposed on the anti-load side of the output shaft 3201. In this case, both ends of the linear detecting portion 3300 and the X motor portion that are disposed on the load side of the output shaft 3201 are supported by the θX bearing portion 3106, and both ends of the θ motor portion and the rotation detecting portion 3400 that are disposed on the anti-load side of the output shaft 3201 are supported by the θX bearing portion 3106.

With respect to the arrangement of the motor portion, the configuration of the ninth embodiment and the configuration of the eighth embodiment are the same in that the θ armature winding and the X armature winding are disposed to be arranged in a longitudinal direction in a concentric shape. However, the ninth embodiment is different from the eighth embodiment in that the θ armature winding 3103 and the X armature winding 3104 are provided on both sides of the anti-load side bracket 3108 provided between the second frame 3102 and the first frame 3101.

With respect to the arrangement of the field portion of the θ motor portion, in the eighth embodiment (refer to FIG. 13), the field portion is attached to the collar that is provided on the outer circumference of the ball spline positioned at the side of the anti-load-side bracket of the output shaft. Meanwhile, the field portion of the θ motor portion according to the ninth embodiment is attached to the collar 3206 provided between the outer circumference of the ball spline 3106a positioned at the side of the anti-load-side bracket 3108 of the output shaft 201 and the outer circumference of the ball spline 3106*a* positioned at the side of the end bracket 3109 of the output shaft 3201.

With respect to the arrangement of the rotation detecting portion 3400, in the eighth embodiment (refer to FIG. 13), the θ encoder is attached to the ball spline at the load side of the output shaft through the collar and the rotation sensor head is attached to the first frame. Meanwhile, in the ninth embodiment, as illustrated in FIG. 14, the θ encoder 3401 that constitutes the rotation detecting portion 3400 is attached to the collar 3206 provided on the anti-load side of the output shaft 3201 and the rotation sensor head 3402 is attached to the second frame 3102.

Since an operation of the ninth embodiment is basically the same as those of the sixth to eighth embodiments, the description thereof will not be repeated.

Therefore, in the ninth embodiment, the θ motor portion including the θ armature winding and the θ field portion and the X motor portion including the X armature winding and the X field portion are disposed to be arranged in series in a longitudinal direction in a concentric shape. In the ninth embodiment, the field portion of the X motor portion is attached to the output shaft and the θ field portion is attached to the collar provided between the outer circumference of the ball spline positioned at the side of the anti-load-side bracket of the output shaft and the outer circumference of the ball spline positioned at the side of the end bracket of the output shaft. Therefore, the length of the magnetic gap is shortened by making the void of the X armature winding and the X field portion and the void of the θ armature winding and the θ field portion close. Therefore, an output can be increased. The length of the actuator in the longitudinal direction increases. However, since an output of the actuator increases, an output per unit volume can be increased.

Next, a tenth embodiment will be described.

Figure 15:
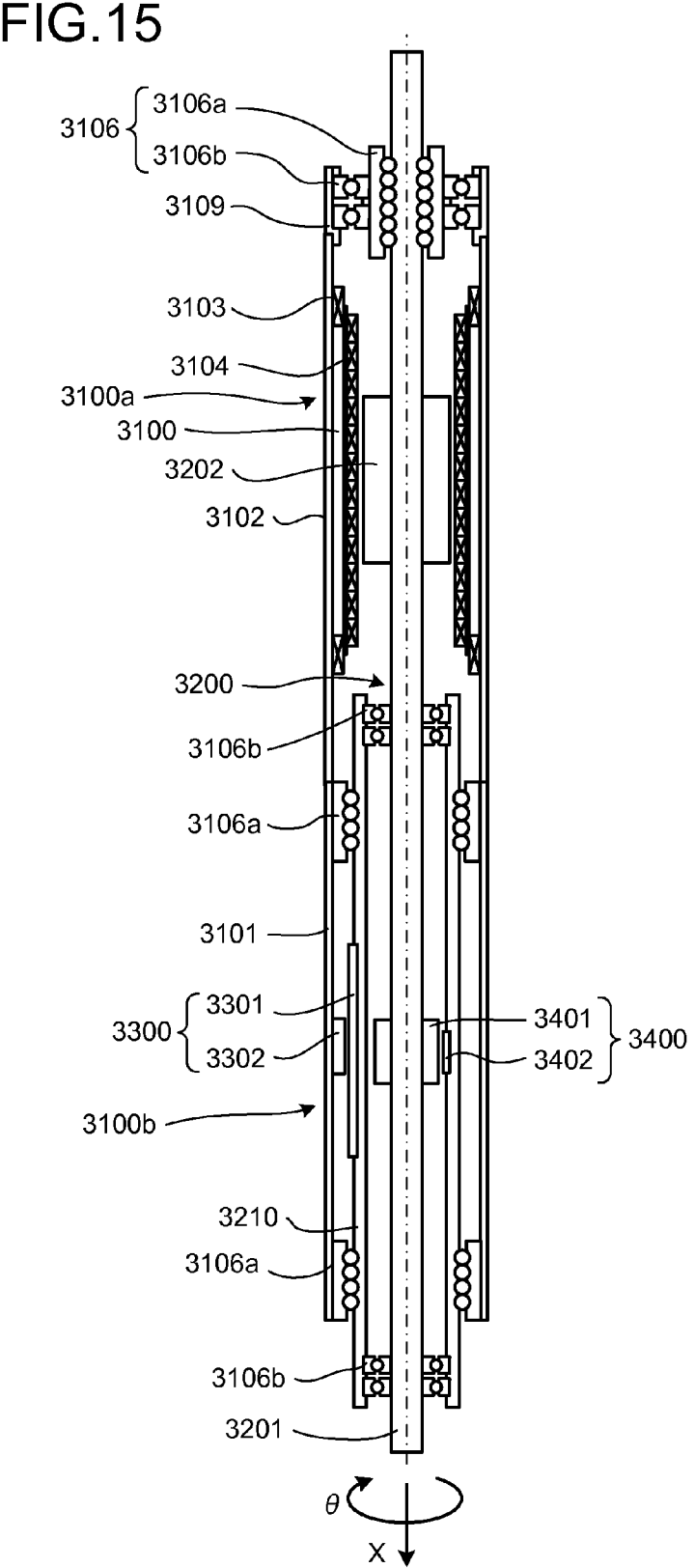
FIG. 15 is a lateral cross-sectional view of an actuator according to a tenth embodiment.

FIG. 15 is a lateral cross-sectional view of an actuator according to the tenth embodiment.

Features of the actuator according to the tenth embodiment that performs the linear/rotation operation are as follows.

In FIG. 15, in a stator 3100 and a mover 3200 of an actuator according to the tenth embodiment that performs the linear/rotation operation, a detecting portion 3100*b* is disposed on the load side of an output shaft 3201 and a motor portion 3100*a* is disposed on the anti-load side.

At the side of the stator 3100 of the motor portion 3100*a*, a cylindrical second frame 3102 that functions as an armature core, an θ armature winding 3103 that generates the rotation magnetic field in a rotation direction, and an X armature winding 3104 that generates the magnetic field in a linear direction are provided in a concentric shape. In the second frame 3102, a motor terminal (not illustrated in the drawings) that externally supplies power to the θ armature winding 3103 and the X armature winding 3104 is provided. Meanwhile, at the side of the mover 3200 of the motor portion 3100*a*, a field portion 3202 that is disposed to face the inner side of the X armature winding 3104 with a magnetic void interposed therebetween is provided on the output shaft 3201. The detailed configuration of the field portion of the mover is the same as that of FIG. 10, and the detailed configuration of an arrangement relationship of the armature winding and the permanent magnet is the same as that of FIG. 11. Therefore, the description thereof will not be repeated.

In the detecting portion 3100*b*, a linear detecting portion 3300 that detects displacement of a linear direction of the output shaft 3201 and a rotation detecting portion 3400 that detects displacement of a rotation direction of the output shaft 3201 are disposed to overlap in a concentric shape, and the above configuration is different from those of the sixth to ninth embodiments.

Specifically, the bearing 3106*b* is provided on the outer circumference of the output shaft 3201, and a hollow cylindrical member 3210 (corresponding to a scale holder) that linearly moves on the inner circumference of the first frame 3101 through the ball spline 3106*a* is fixed to the outer ring of the bearing 3106*b*. The rotation detecting portion 3400 includes a θ encoder 3401 that is attached to the outer circumference of the output shaft 3201 and a rotation sensor head 3402 that is provided on the inner circumference of the hollow cylindrical member 3210 to face the θ encoder 3401. The linear detecting portion 3300 includes an optical linear scale 3301 that is provided on the outer circumference e of the hollow cylindrical member 3210 and an optical linear sensor head 3302 that is attached to the inner circumference of the first frame 3101.

In the support mechanism, as described above, the ball splines 3106*a* that are disposed on both ends of the first frame 3101 where the detecting portion 3100*b* is disposed and the bearings 3106*b* that are disposed on the inner circumference of the ball splines 3106*a* through the hollow cylindrical member 3210 constitute the θX bearing portions 3106. Further, the θX bearing portion 3106 is configured by the ball spline 3106*a* and the bearing 3106*b* in the end bracket 3109 positioned at the anti-load side of the second frame 3102 where the motor portion 3100*a* is disposed. That is, the outer ring of the bearing 3106*b* of the θX bearing portion 3106 that is positioned at the detecting portion 3100*b* is fixed to the inner circumference of the hollow cylindrical member 3210 that moves along the ball spline 3106*a* of the inner circumference of the first frame 3101. The inner ring of the other bearing 3106*b* rotates about the hollow cylindrical member 3210 together with the output shaft 3201, in a state in which the inner ring is fixed to the outer circumference of the output shaft 3201.

Next, an operation will be described. The actuator that has the above-described configuration generates torque in the mover 3200 with an action with the magnetic field generated by the permanent magnet of the field portion by flowing the current to the θ armature winding 3103. The thrust force is generated in the mover 3200 with an action with the magnetic field generated by the permanent magnet of the field portion by flowing the current to the X armature winding 3104, and the linear operation and the rotation operation can be performed.

When the current is supplied to only one θ armature winding 3103, the output shaft 3201 rotates relatively with respect to the hollow cylindrical member 3210 facing the output shaft 3201, in a state in which the output shaft 3201 is supported radially by the bearing 3106*b* of the θX bearing 3106 positioned at the detecting portion 3100*b*. At this time, the θ encoder 3401 that is fixed to the outer circumference of the output shaft 3201 rotates at the same time, and the rotation position of the output shaft is detected by the rotation sensor head 3402 that is provided on the inner circumference of the hollow cylindrical member 3210 to face the θ encoder 3401.

When the current is supplied to only the other X armature winding 3104, the hollow cylindrical member 3210 linearly moves in a state in which the hollow cylindrical member is supported axially by the ball spline 3106*a* of the θX bearing 3106 positioned at the detecting portion 3100*b*, and the output shaft 3201 that is supported axially by the hollow cylindrical member 3210 linearly moves at the same time. At this time, the linear scale 3301 that is attached to the outer circumference of the hollow cylindrical member 3210 linearly moves at the same time, and the linear position of the output shaft is detected by the linear sensor head 3302 provided on the inner circumference of the first frame 3101 to face the linear scale 3301.

If the current is supplied to both the θ armature winding 3103 and the X armature winding 3104, the output shaft 3201 rotates, the hollow cylindrical member 3210 linearly moves at the same time as the rotation of the output shaft, and rotation detection and linear detection can be performed with high precision.

Therefore, in the tenth embodiment, in the motor portion, the length of the actuator in a longitudinal direction can be decreased by disposing the θ armature winding and the X armature winding to overlap in a concentric shape. Therefore, an output per unit volume can be increased and an actuator having a high output can be provided.

The θX bearing portion includes one ball spline and two bearings. The θX bearing portion is disposed on both sides of the detecting portion and the rotation detecting portion and the linear detecting portion that constitute the detecting portion are disposed to overlap in a concentric shape, and looseness or eccentricity of the output shaft in the detecting portion can be reduced as compared with the sixth to ninth embodiments. Therefore, straightness or rotation deflection precision of the output shaft can be improved. Since the straightness or rotation deflection precision of the output shaft can be improved, the straightness of the linear scale of the linear detecting portion and the rotation deflection precision of the θ encoder of the rotation detecting portion that are disposed on the output shaft can be improved, and the position of the linear direction and the angle of the rotation direction can be detected with high precision.

The end bracket is disposed on the anti-load side of the motor portion and the output shaft is supported by the θX bearing portion, and this configuration becomes equivalent to the configuration where the θX bearing portion is disposed on both sides of the motor portion. Therefore, looseness or eccentricity of the field portion can be reduced. The looseness or eccentricity of the output shaft can be reduced and straightness or rotation deflection precision of the output shaft can be improved.

Next, an eleventh embodiment will be described.

Figure 16:
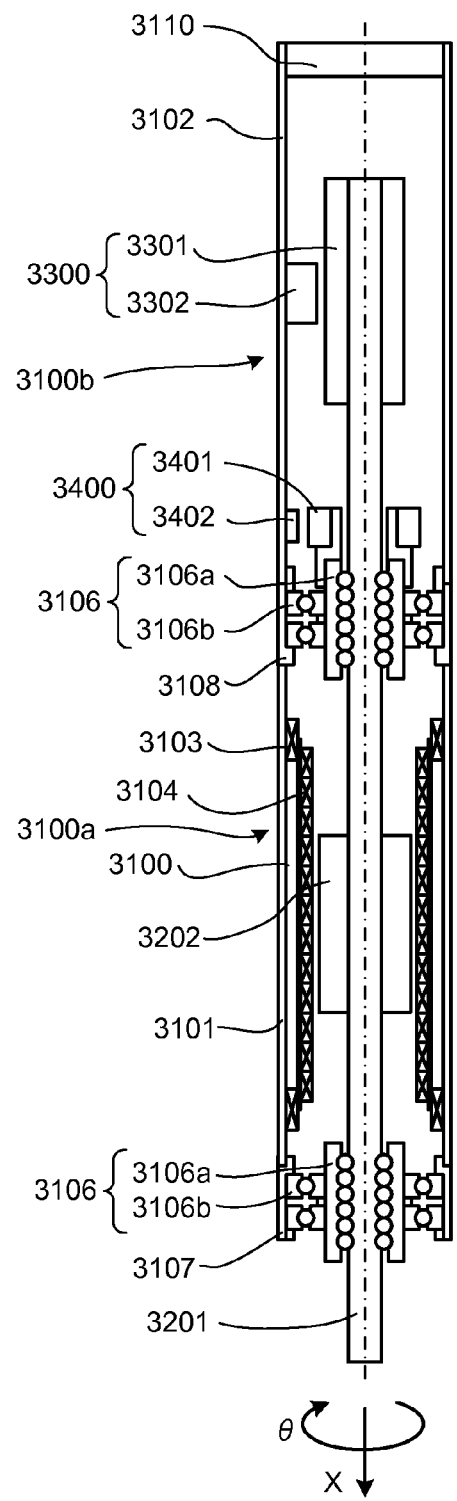
FIG. 16 is a lateral cross-sectional view of an actuator according to an eleventh embodiment.

FIG. 16 is a lateral cross-sectional view of an actuator according to the eleventh embodiment.

Features of the actuator according to the eleventh embodiment that performs the linear/rotation operation are as follows.

In FIG. 16, in a stator 3100 and a mover 3200 of an actuator according to the eleventh embodiment that performs the linear/rotation operation, a motor portion 3100a is disposed on the load side of an output shaft 3201 and a detecting portion 3100b is disposed on the anti-load side.

At the side of the stator 3100 of the motor portion 3100a, a cylindrical first frame 3101 that functions as an armature core, an θ armature winding 3103 that generates the rotation magnetic field in a rotation direction, and an X armature winding 3104 that generates the magnetic field in a linear direction are provided in a concentric shape. In the first frame 3101, a motor terminal (not illustrated in the drawings) that externally supplies power to the θ armature winding 3103 and the X armature winding 3104 is provided. Meanwhile, at the side of the mover 3200 of the motor portion 3100a, a field portion 3202 that is disposed to face the inner side of the X armature winding 3104 with a magnetic void interposed therebetween is provided on the output shaft 3201. The output shaft 3201 is made of stainless steel to be a non-magnetic field.

As such, in the motor portion 3100a, the length of the actuator in a longitudinal direction can be decreased by disposing the θ armature winding 3103 and the X armature winding 3104 to overlap in a concentric shape. Therefore, an output per unit volume can be increased.

The detecting portion 3100b includes a linear detecting portion 3300 that detects displacement of a linear direction of the output shaft 3201 and a rotation detecting portion 3400 that detects displacement of a rotation direction of the output shaft 3201.

The linear detecting portion 3300 includes a cylindrical optical linear scale 3301 that is fixed to the outer circumference of the output shaft 3201 and an optical linear sensor head 3302 that is attached to the inner circumference of the second frame 3102. In the rotation detecting portion 3400, a θ encoder 3401 that is fixed to the ball spline 3106a of a θX bearing portion 3106 to be described below through the collar 3403 and a rotation sensor head 3402 that is fixed to the second frame 3102 are disposed. In the θ encoder 3401 that constitutes the rotation detecting portion 3400, a permanent magnet is used. In the rotation sensor head 3402, the magnetic detecting elements such as four MR elements or hall elements that are disposed equally on the outer circumference at the inner side of the second frame 3102 to face the permanent magnet 1404a with a void interposed therebetween are used, and a so-called magnetic encoder is configured. In the second frame 3102, a detector terminal (not illustrated in the drawings) that externally supplies power to the linear detecting portion 3300 and the rotation detecting portion 3400 and outputs a detection signal of a position X and an angle θ is provided.

In the support mechanism, a load-side bracket 3107 is disposed on the load side of the first frame 3101 where the motor portion 3100a is disposed and an anti-load-side bracket 3108 is disposed on the anti-load side. In the load-side bracket 3107 and the anti-load-side bracket 3108, a θX bearing portion 3106 that includes one ball spline 3106a and two bearings 3106b is disposed. An end cap 3110 is provided on the anti-load side of the second frame 3102 where the detecting portion 3100b is disposed.

Next, an operation will be described. In the actuator that has the above-describe configuration, the load side of the output shaft 3201 is supported to linearly move in the X direction by the ball splines 3106a constituting the θX bearing portions 3106 provided in the two places of the load-side bracket 3107 and the anti-load side bracket 3108 of the first frame 3101. In the actuator, the output shaft 3201 and the ball spline 3106a are supported to rotate in a θ direction by the bearings 3106b provided in the two places of the same portions as the ball spline 3106a. Thereby, the output shaft 3201 where the motor portion 3100a is disposed with respect to a portion of the first frame 3101 in the stator 3100 is supported at both ends, and a rotation operation in the θ direction and a linear operation in the X direction can be freely performed. Since the θ encoder 3401 is provided outside the ball spline 3106a positioned at the side of the anti-load-side bracket 3108 of the output shaft 3201 through the collar 3403, the length of the anti-load side of the output shaft 3201 that constitutes the detecting portion 3100b can be reduced. A load (not illustrated in the drawings) is provided on a tip of the output shaft 3201, and the load can be freely moved in the θ direction and the X direction.

Therefore, in the eleventh embodiment, in the motor portion, the length of the actuator in a longitudinal direction can be decreased by disposing the θ armature winding and the X armature winding to overlap in a concentric shape. Therefore, an output per unit volume can be increased and an actuator having a high output can be provided.

The θX bearing portion includes one ball spline and two bearings and is disposed on both sides of the motor portion. As a result, looseness or eccentricity of the output shaft in the motor portion can be reduced and straightness or rotation deflection precision of the output shaft can be improved. Since the straightness or rotation deflection precision of the output shaft can be improved, the straightness of the linear scale of the linear detecting portion that is disposed on the output shaft and the rotation deflection precision of the θ encoder of the rotation detecting portion can be improved. The position of the linear direction and the angle of the rotation direction can be detected with high precision.

In addition to the configuration where the motor portion is disposed on the load side of the output shaft and the detecting portion is disposed on the anti-load side, the θ encoder that constitutes the rotation detecting portion is provided in the portion of the ball spline constituting the θX bearing portion in the anti-load-side bracket. Therefore, the length of the anti-load side of the output shaft that constitutes the detecting portion can be reduced. Since the θ encoder is rotatably supported by the bearing of the anti-load-side bracket, the radial clearance of the bearing becomes the averaged clearance change and is the magnetic gap change of several micrometers. In the case of the magnetic encoder where the permanent magnet is used in the θ encoder and the magnetic detecting elements such as the MR elements or the hall elements are used in the rotation sensor head facing the θ encoder, detection error of the magnetic encoder can be alleviated.

Next, a twelfth embodiment will be described.

Figure 17:
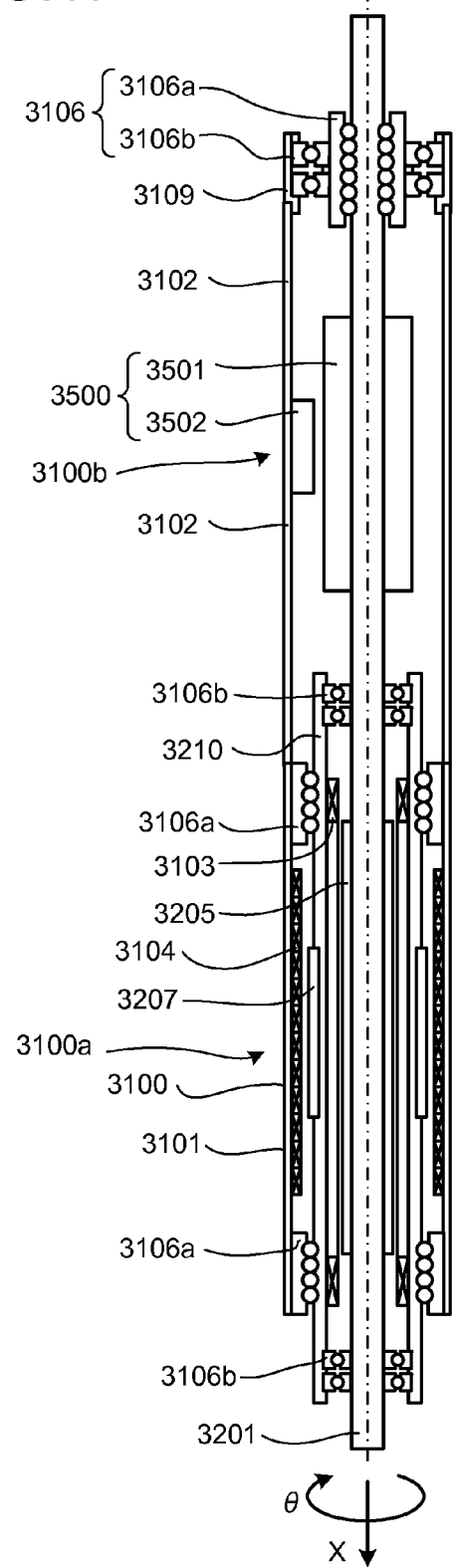
FIG. 17 is a lateral cross-sectional view of an actuator according to a twelfth embodiment.

FIG. 17 is a lateral cross-sectional view of an actuator according to the twelfth embodiment.

The actuator according to the twelfth embodiment that performs the linear/rotation operation is different from the actuator according to the eleventh embodiment in the following points.

That is, the actuator according to the eleventh embodiment is configured such that the motor portions for linear/rotation driving are disposed to overlap in a concentric shape at the side of the first frame. Meanwhile, in the actuator according to the twelfth embodiment, in the motor portions 3100a for linear/rotation driving that are disposed at the side of the first frame 3101, the field portion and the armature portion are disposed to overlap in a concentric shape. Specifically, the bearing 3106b is provided on the outer circumference of the output shaft 3201, and a hollow cylindrical member 3210 that linearly moves on the inner circumference of the first frame 3101 through the ball spline 3106a is fixed to the outer ring of the bearing 3106b. The θ motor portion includes a θ field portion 3205 that is attached to the outer circumference of the output shaft 3201 and an θ armature winding 3103 that is provided on the inner circumference of the hollow cylindrical member 3210 to face the θ field portion 3205. The X motor portion includes an X field portion 3207 that is provided on the outer circumference of the hollow cylindrical member 3210 and an X armature winding 3104 that is attached to the inner circumference of the first frame 3101.

In the eleventh embodiment, a detecting portion that includes a rotation detecting portion and a linear detecting portion to detect displacement of a rotation direction and a linear direction is disposed on the side of the second frame. Meanwhile, in the twelfth embodiment, a linear/rotation detecting portion 3500 that includes a linear/rotation scale 3501 and a linear/rotation sensor head 3502 is provided.

Next, an operation will be described. The actuator that has the above-described configuration generates torque in the mover 3200 with an action with the magnetic field generated by the permanent magnet of the θ field portion 3205 by flowing the current to the θ armature winding 3103. The actuator generates thrust force in the mover 3200 with an action with the magnetic field generated by the permanent magnet of the X field portion 3207 by flowing the current to the X armature winding 3104.

When the current is supplied to only one θ armature winding 3103, the hollow cylindrical member 3210 rotates in a state in which the output shaft 3201 is supported radially by the bearing 3106b of the θX bearing 3106 positioned at the detecting portion 3100a. At this time, the linear/rotation scale 3501 that is fixed to the outer circumference of the output shaft 3201 rotates at the same time, and the rotation position of the output shaft 3201 is detected by the linear/rotation sensor head 3502 that is attached to the second frame 3102 to face the linear/rotation scale 3501.

When the current is supplied to only the other X armature winding 3104, the hollow cylindrical member 3210 linearly moves in a state in which the hollow cylindrical member 3210 is supported axially by the ball spline 3106a of the θX bearing 3106 positioned at the motor portion 3100a, and the output shaft 3201 that is supported axially by the hollow cylindrical member 3210 linearly moves at the same time. At this time, the linear/rotation scale 3501 that is attached to the outer circumference of the hollow cylindrical member 3210 linearly moves at the same time, and the linear position of the output shaft 3201 is detected by the linear/rotation sensor head 3502 attached to the second frame 3102 provided on the inner circumference of the output shaft 3201.

Therefore, in the twelfth embodiment, the length of the actuator in a longitudinal direction can be decreased by disposing the field portion and the armature portion to overlap in a concentric shape, in the motor portions 3100a for linear/rotation driving disposed at the side of the first frame 3101. Thereby, an output per unit volume can be increased and an actuator having a high output can be provided.

The θX bearing portion includes one ball spline and two bearings. The θX bearing portion is disposed on both sides of the motor portion, and the field portion and the armature portion that constitute the θ motor portion and the field portion and the armature portion that constitute the X motor portion are disposed to overlap in a concentric shape. Thereby, looseness or eccentricity of the output shaft in the detecting portion can be reduced as compared with the eleventh embodiment, and straightness or rotation deflection precision of the output shaft can be improved. Since the straightness or rotation deflection precision of the output shaft can be improved, the straightness of the linear scale of the linear detecting portion and the rotation deflection precision of the θ encoder of the rotation detecting portion that are disposed on the output shaft can be improved, and the position of the linear direction and the angle of the rotation direction can be detected with high precision.

The end bracket is disposed on the anti-load side of the detecting portion and the output shaft is supported by the θX bearing portion, and this configuration becomes equivalent to the configuration where the θX bearing portion is disposed on both sides of the detecting portion. Therefore, looseness or eccentricity of the direct rotation scale can be reduced. The looseness or eccentricity of the output shaft can be reduced and straightness or rotation deflection precision of the output shaft 3201 can be improved.

Next, a thirteenth embodiment will be described.

Figure 18:
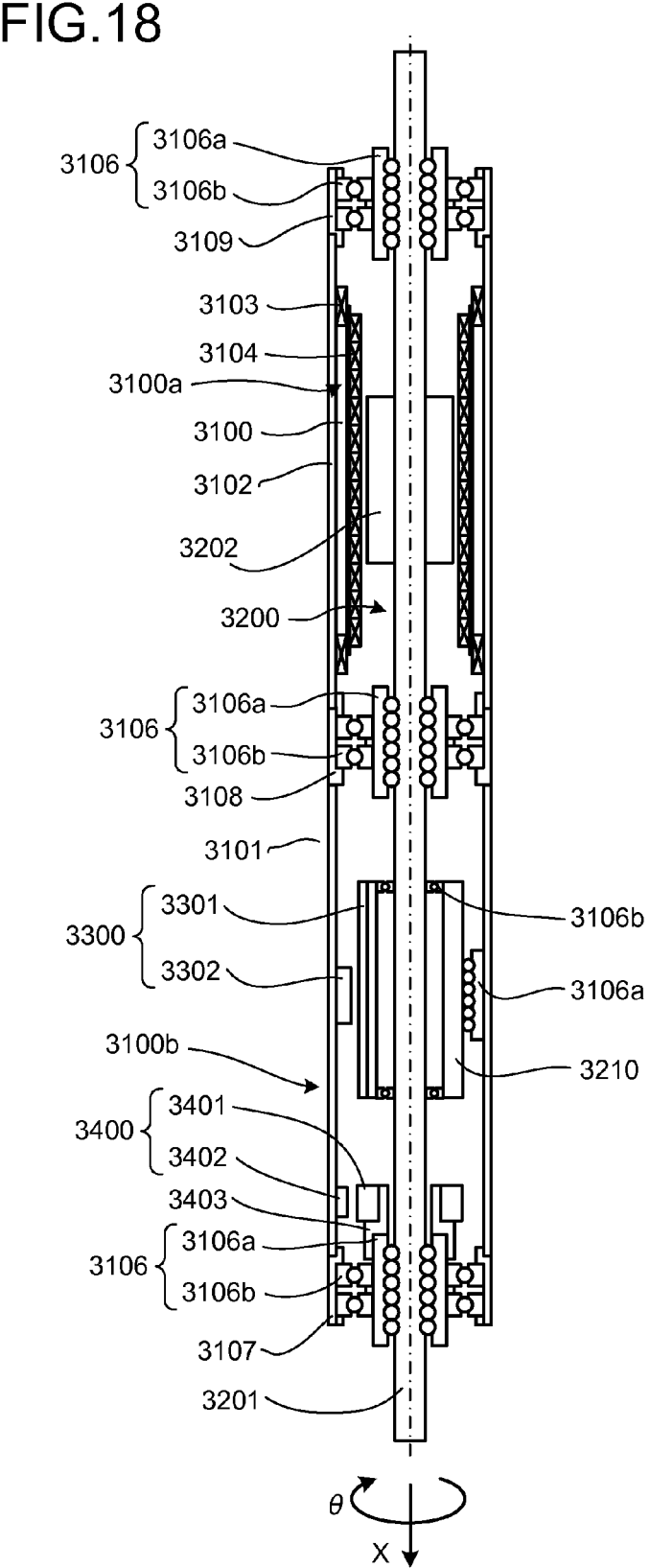
FIG. 18 is a lateral cross-sectional view of an actuator according to a thirteenth embodiment.

FIG. 18 is a lateral cross-sectional view of an actuator according to the thirteenth embodiment.

The actuator according to the thirteenth embodiment that performs the linear/rotation operation is different from the actuator according to the sixth embodiment in the following points.

That is, in the detecting portion 3100b of the actuator according to the sixth embodiment, the bearing 3106b is provided on the outer circumference of the output shaft 3201, and a hollow cylindrical member 3210 (corresponding to a scale holder) that linearly moves on the inner circumference of the first frame 3101 through the ball spline 3106a is fixed to the outer ring of the bearing 3106b. In this configuration, the linear detecting portion 3300 includes an optical linear scale 3301 that is provided on the outer circumference of the hollow cylindrical member 3210 and an optical linear sensor head 3302 that is attached to the inner circumference of the first frame 3101.

Next, an operation will be described. The actuator that has the above-described configuration generates torque in the mover 3200 with an action with the magnetic field generated by the permanent magnet of the field portion by flowing the current to the θ armature winding 3103. The thrust force is generated in the mover 3200 with an action with the magnetic field generated by the permanent magnet of the field portion by flowing the current to the X armature winding 3104, and a rotation operation and a linear operation can be performed.

When the current is supplied to only one θ armature winding 3103, the output shaft 3201 rotates relatively with respect to the hollow cylindrical member 3210 facing the output shaft 3201, in a state in which the output shaft 3201 is supported radially by the bearing 3106b of the θX bearing 3106 positioned at the detecting portion 3100b. At this time, the hollow cylindrical member 3210 does not rotate.

When the current is supplied to only the other X armature winding 3104, the output shaft 3201 linearly moves in a state in which the hollow cylindrical member 3210 is supported axially by the ball spline 3106a of the θX bearing 3106 positioned at the detecting portion 3100b, and the output shaft 3201 that is supported axially by the hollow cylindrical member 3210 linearly moves at the same time. At this time, the hollow cylindrical member 3210 where the linear scale 3301 is attached to the outer circumference linearly moves at the same time, and the linear position of the output shaft is detected by the linear sensor head 3302 provided on the inner circumference of the first frame 3101 to face the linear scale 3301.

If the current is supplied to both the θ armature winding 3103 and the X armature winding 3104, the output shaft 3201 simultaneously performs a rotation operation and a linear operation and rotation detection and linear detection can be performed with high precision.

Therefore, in the thirteenth embodiment, the linear scale of the linear detecting portion that constitutes the detecting portion is attached to the hollow cylindrical member, the hollow cylindrical member is linearly moved through the ball spline, and rotation is stopped. Therefore, looseness or eccentricity of the output shaft in the detecting portion can be reduced as compared with the sixth embodiment, and straightness or rotation deflection precision of the output shaft can be improved.

In this embodiment, the optical linear sensor is used when the linear displacement in the X direction is detected, but this configuration is only exemplary. For example, a sensor that detects the magnetic change may be used. The magnetic sensor is used when the rotation angle of the θ direction is detected, but this configuration is only exemplary. For example, a sensor that detects reflection (or transmission) of light may be used.

The ball spline or the ball bearing is used as the smooth support mechanism. However, a rotary ball spline that is configured by integrating the ball spline and the ball bearing may be used. The support mechanism may be changed according to needed precision of a support portion, and a sliding bearing or a fluid bearing may be used.

In the actuator that is described in this embodiment, the operations of the linear direction and the rotation direction are realized while the width direction is narrowed. The actuator according to this embodiment is suitable when the plural actuators are connected in the width direction and the depth direction. At this time, the plural actuators are connected in the width direction and the depth direction such that the linear scale and the linear sensor to detect the position of the linear direction are positioned on the front surface. By connecting the plural actuators in the width direction and the depth direction according to the position relationship described above, the interval of the output shafts in the width direction can be narrowed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

In regards to the embodiments, the following aspects are disclosed.

(Note 1) An actuator, comprising:

support mechanisms that are disposed on both ends of an output shaft in a concentric shape in a frame and support the output shaft freely in a linear direction and a rotation direction;

motor portions that are disposed in a concentric shape between the support mechanisms in a longitudinal direction with respect to the output shaft and drive the output shaft in the linear direction and the rotation direction;

a first detecting portion that is disposed in the support mechanism to support the output shaft in the linear direction and detects an angle of the rotation direction; and a second detecting portion that is disposed through a holding portion to rotatably support the output shaft and detects displacement of the linear direction.

(Note 2) The actuator of Note 1, wherein, in the support mechanisms, a bearing that supports the output shaft in the rotation direction is attached to the frame and a bearing that supports the output shaft in the linear direction through a sleeve attached to the bearing is provided.

(Note 3) The actuator of Note 1, wherein the motor portion includes an armature winding that drives the output shaft in the rotation direction in a concentric shape with the frame and an armature winding that drives the output shaft in the linear direction to overlap the armature winding.

(Note 4) The actuator of Note 1, wherein the motor portion includes an armature winding that drives the output shaft in the rotation direction in a concentric shape with the frame and an armature winding that is disposed in a longitudinal direction of the output shaft and drives the output shaft.

(Note 5) The actuator of Note 1, wherein the output shaft is supported by the support mechanisms, the holding portion, and a linear bearing supporting an arm extended from one end of the holding portion in the linear direction and the rotation direction.

(Note 6) The actuator of Note 1, wherein the detecting portion that detects the angle of the rotation direction includes a detection object and a detector and the detection object is attached to a collar included in the support mechanism to support the output shaft in the linear direction.

(Note 7) The actuator of Note 1,
wherein the detecting portion that detects displacement of the linear direction includes a detection object and a detector and the detection object is attached to an arm extended through an opening of a bracket included at the anti-load side of the frame from a holding portion to rotatably support the output shaft and supported by a linear bearing.

(Note 8) An actuator, comprising:
a rotation driving portion that has a first mover to be rotatably provided and a first stator to be disposed in a concentric shape on the outer circumference of the first mover with a magnetic gap interposed therebetween; and
a linear driving portion that has a second mover to be provided movably along an axial direction and a second stator to be disposed in a concentric shape on the outer circumference of the second mover with a magnetic gap interposed therebetween,
wherein the rotation driving portion and the linear driving portion are disposed in parallel to perform a linear/rotation operation.

(Note 9) The actuator of Note 8,
wherein the rotation driving portion and the linear driving portion are stored in the same case.

(Note 10) The actuator of Note 8 or 9,
wherein, in the rotation driving portion and the linear driving portion, support mechanisms that support the output shaft in the linear direction and the rotation direction are provided on both ends of the output shaft that constitutes the mover of each driving portion to form a concentric shape with the stator of each driving portion, and
a detecting portion including a first detecting portion that detects an angle of the rotation direction of the output shaft of each driving portion and a second detecting portion that detects displacement of the linear direction of the output shaft is provided.

(Note 11) The actuator of Note 10,
wherein, in the support mechanisms of the rotation driving portion, a first bearing that rotatably supports the output shaft is attached to a frame, and a second bearing that linearly supports the output shaft through a collar is provided on an inner circumferential surface of the first bearing,
the second detecting portion that detects displacement of the linear direction is provided on the anti-load side of the rotation driving portion and includes a detection object and a detector,
the detection object is included in a hollow cylindrical member that is attached to an outer ring of a third bearing that rotatably supports the anti-load side of the output shaft of the rotation driving portion in a radial direction, and
the hollow cylindrical member is connected to the output shaft of the linear driving portion by the arm.

(Note 12) The actuator of Note 10,
wherein, in the support mechanisms of the rotation driving portion, a first bearing that rotatably supports the output shaft is attached to a frame, and a second bearing that linearly supports the output shaft through a collar is provided on an inner circumferential surface of the first bearing,
the detecting portion is provided between the support mechanisms of the load side and the anti-load side of the rotation driving portion and includes a detection object and a detector, and
a third bearing that rotatably supports the output shaft in a radial direction is provided in an end of the output shaft of the rotation driving portion, and an arm that is attached to an outer ring of the third bearing is connected to the output shaft of the linear driving portion to perform a linear/rotation operation.

(Note 13) The actuator of Note 8 or 10,
wherein the rotation driving portion and the linear driving portion include a field that includes a permanent magnet as a field magnet or iron teeth and an armature that is disposed to face the field with a magnetic void interposed therebetween and generates movement magnetic field.

(Note 14) The actuator of Note 8 or 10,
wherein a field portion in a motor portion in the rotation driving portion is attached to a collar included in the second bearing to linearly support the output shaft.

(Note 15) The actuator of Note 10,
wherein both the detection object of the first detecting portion and the field portion of the motor portion in the rotation driving portion are attached to a collar included in the second bearing to linearly support the output shaft.

(Note 16) The actuator of Note 10,
wherein the first detecting portion that detects the angle of the rotation direction includes a detection object and a detector and the detection object is attached to a collar included in the second bearing to rotatably support the output shaft.

(Note 17) The actuator of Note 10,
wherein the detecting portion is configured by integrating the first detecting portion and the second detecting portion.

(Note 18) The actuator of Note 10,
wherein the output shaft is made of a non-magnetic material.

(Note 19) An actuator, comprising:
support mechanisms that are disposed in plural of places of an output shaft in a longitudinal direction to form a concentric shape in a frame and support the output shaft in a linear direction and a rotation direction;
motor portions that are disposed in a concentric shape between the support mechanisms in the longitudinal direction of the output shaft and drive the output shaft in the linear direction and the rotation direction; and
a detecting portion that includes a first detecting portion to detect an angle of the rotation direction of the output shaft and a second detecting portion to detect displacement of the linear direction of the output shaft.

(Note 20) The actuator of Note 19,
wherein the motor portion includes a field that includes a permanent magnet as a field magnet or iron teeth and an armature that is disposed to face the field with a magnetic void interposed therebetween and generates movement magnetic field.

(Note 21) The actuator of Note 19 or 20,
wherein the motor portion includes a first armature winding that drives the output shaft in the rotation direction and a second armature winding that drives the output shaft in the linear direction to overlap the first armature winding in a concentric shape.

(Note 22) The actuator of Note 19 or 20,
wherein the motor portion includes a first armature winding that drives the output shaft in the rotation direction and a second armature winding that is disposed in series to the first armature winding in a concentric shape in the longitudinal direction of the output shaft and drives the output shaft in the linear direction.

(Note 23) The actuator of Note 19,
wherein, in the support mechanisms, a first bearing that rotatably supports the output shaft is attached to the frame, and a second bearing that linearly supports the output shaft through a collar is provided on an inner circumferential surface of the first bearing.

(Note 24) The actuator of Note 19,
wherein the detecting portion is configured by integrating the first detecting portion and the second detecting portion.

(Note 25) The actuator of Note 19,
wherein the detection object of the first detecting portion is attached to a collar included in a bearing of the support mechanism to linearly support the output shaft, and the other detecting portion is attached to a frame.

(Note 26) The actuator of Note 19 or 22,
wherein the field portion of the motor portion is attached to a collar included in the second bearing to linearly support the output shaft.

(Note 27) The actuator of Note 19,
wherein both the detection object of the first detecting portion and the field portion of the motor portion are attached to a collar included in the bearing of the support mechanism to linearly support the output shaft.

(Note 28) The actuator of Note 19,
wherein the detecting portion is disposed on the load side of the output shaft and the motor portion is disposed on the anti-load side of the output shaft.

(Note 29) The actuator of Note 19,
wherein, in the support mechanisms of the detecting portion, a hollow cylindrical member that is disposed on the outer circumference of a bearing to rotatably support the output shaft and rotatably supports the output shaft through a bearing attached to the inner circumference of the frame is provided,
the detection object of the first detecting portion is provided on the outer circumference of the output shaft, and the other detecting portion is provided on the inner circumference of the hollow cylindrical member, and
the detection object of the second detecting portion is provided on the outer circumference of the hollow cylindrical member and the other detecting portion is provided on the inner circumference of the frame.

(Note 30) The actuator of Note 19,
wherein, in the support mechanisms of the motor portion, a hollow cylindrical member that is disposed on the outer circumference of a bearing to rotatably support the output shaft and rotatably supports the output shaft through a bearing attached to the inner circumference of the frame is provided,
the field portion of the motor portion that is driven in the rotation direction is provided on the outer circumference of the output shaft, and the other armature winding is provided on the inner circumference of the hollow cylindrical member, and
the field portion of the motor portion that is driven in the linear direction is provided on the outer circumference of the hollow cylindrical member and the other armature winding is provided on the inner circumference of the frame.

(Note 31) The actuator of Note 19,
wherein the output shaft is made of a non-magnetic material.

What is claimed is:

1. An actuator, comprising:
support mechanisms that are disposed in a plurality of places of output shafts in a longitudinal direction to form a concentric shape in a frame and support the output shaft in a linear direction and a rotation direction;
motor portions that are disposed in the longitudinal direction of the output shaft and drive the output shaft in the linear direction and the rotation direction;
a first detecting portion that detects an angle of the rotation direction of the output shaft;
a second detecting portion that detects displacement of the direct direction of the output shaft; and
an arm that is connected to an anti-load-side one of the support mechanisms, which supports the output shaft in the rotation direction, to be extended toward another of the support mechanisms and that linearly moves along with the output shaft, wherein
the first detecting portion is provided on one of the support mechanisms, and
the second detecting portion includes a detector attached to the frame and a detection object attached to the arm.

2. The actuator of claim 1,
wherein the support mechanisms are disposed on both ends of the output shaft,
the motor portion is disposed in a concentric shape between the support mechanisms of the longitudinal direction with respect to the output shaft,
the first detecting portion is disposed in the support mechanisms that supports the output shaft in the linear direction, and
the second detecting portion is disposed through a holding portion to rotatably support the output shaft.

3. The actuator of claim 2,
wherein, in the support mechanisms, a bearing that supports the output shaft in the rotation direction are attached to the frame and a bearing that supports the output shaft in the linear direction through a sleeve attached to the bearing is included.

4. The actuator of claim 2,
wherein the motor portion includes an armature winding that drives the output shaft in the rotation direction in a concentric shape with the frame and an armature winding that drives the output shaft in the linear direction to overlap the armature winding.

5. The actuator of claim 2,
wherein the motor portion includes an armature winding that drives the output shaft in the rotation direction in a concentric shape with the frame and an armature winding that is disposed in the longitudinal direction of the output shaft and drives the output shaft.

6. The actuator of claim 2,
wherein the output shaft is supported by the support mechanisms, the holding portion, and a linear bearing supporting an arm extended from one end of the holding portion in the linear direction and the rotation direction.

7. The actuator of claim 2,
wherein the detecting portion that detects the angle of the rotation direction includes a detection object and a detector and the detection object is attached to a collar included in the support mechanism to support the output shaft in a linear direction.

8. The actuator of claim 1,
wherein the motor portion is disposed in a concentric shape between the support mechanisms in the longitudinal direction of the output shaft.

9. The actuator of claim 8,
wherein the motor portion includes a field that includes a permanent magnet as a field magnet or iron teeth and an armature that is disposed to face the field with a magnetic void interposed therebetween and generates movement magnetic field.

10. The actuator of claim 8,
wherein the motor portion includes a first armature winding that drives the output shaft in the rotation direction and a second armature winding that drives the output shaft in the linear direction to overlap the first armature winding in a concentric shape.

11. The actuator of claim 8,
wherein the motor portion includes a first armature winding that drives the output shaft in the rotation direction and a second armature winding that is disposed in series to the first armature winding in a concentric shape in the longitudinal direction of the output shaft and drives the output shaft in the linear direction.

12. The actuator of claim 8,
wherein, in the support mechanisms, a first bearing that rotatably supports the output shaft is attached to the frame, and a second bearing that linearly supports the output shaft through a collar is provided on an inner circumferential surface of the first bearing.

13. An actuator, comprising:
support means that are disposed in a plurality of places of an output shaft in a longitudinal direction in a frame and support the output shaft in a linear direction and a rotation direction;
a driving means that drives the output shaft in the linear direction and the rotation direction;
a detecting means that includes a first detecting means to detect an angle of the rotation direction of the output shaft and a second detecting means to detect displacement of the linear direction of the output shaft; and
an arm that is connected to an anti-load-side one of the support means, which supports the output shaft in the rotation direction, to be extended toward another of the support means and that linearly moves along with the output shaft, wherein
the first detecting means is provided on one of the support means, and
the second detecting means includes a detector attached to the frame and a detection object attached to the arm.

14. An actuator, comprising:
support mechanisms that are disposed in a plurality of places of output shafts in a longitudinal direction to form a concentric shape in a frame and support the output shaft in a linear direction and a rotation direction;
motor portions that are disposed in the longitudinal direction of the output shaft and drive the output shaft in the linear direction and the rotation direction;
a first detecting portion that detects an angle of the rotation direction of the output shaft;
a second detecting portion that detects displacement of the direct direction of the output shaft; and
an arm that is connected to an anti-load-side one of the support mechanisms, which supports the output shaft in the rotation direction, to be extended toward another of the support mechanisms and that linearly moves along with the output shaft, wherein
the first detecting portion is provided on one of the support mechanisms,
the second detecting portion includes a detector attached to the frame and a detection object attached to the arm,
the first detecting portion includes a detector and a detection object,
the detector of the first detecting portion is provided on one of the support mechanisms that supports the output shaft in the rotation direction,
the detection object of the first detecting portion is provided on one of the support mechanisms that supports the output shaft in the linear direction, and
the one of the support mechanisms that supports the output shaft in the rotation direction is provided on the one of the support mechanisms that supports the output shaft in the linear direction.

15. An actuator, comprising:
support means that are disposed in a plurality of places of output shafts in a longitudinal direction in a frame and support the output shaft in a linear direction and a rotation direction;
a driving means that drives the output shaft in the linear direction and the rotation direction;
a detecting means that includes a first detecting means to detect an angle of the rotation direction of the output shaft and a second detecting means to detect displacement of the linear direction of the output shaft; and
an arm that is connected to an anti-load-side one of the support means, which supports the output shaft in the rotation direction, to be extended toward another of the support means and that linearly moves along with the output shaft, wherein
the first detecting means is provided on one of the support means,
the second detecting means includes a detector attached to the frame and a detection object attached to the arm,
the first detecting means includes a detector and a detection object,
the detector of the first detecting means is provided on one of the support means that supports the output shaft in the rotation direction,
the detection object of the first detecting means is provided on one of the support means that supports the output shaft in the linear direction, and
the one of the support means that supports the output shaft in the rotation direction is provided on the one of the support means that supports the output shaft in the linear direction.

* * * * *